(12) United States Patent
Seo

(10) Patent No.: US 11,894,758 B2
(45) Date of Patent: Feb. 6, 2024

(54) ROTOR PLATE AND ROTOR ASSEMBLY INCLUDING THE SAME

(71) Applicant: HYUNDAI MOBIS CO., LTD., Seoul (KR)

(72) Inventor: Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 100 days.

(21) Appl. No.: 17/857,445

(22) Filed: Jul. 5, 2022

(65) Prior Publication Data

US 2023/0006515 A1    Jan. 5, 2023

(30) Foreign Application Priority Data

Jul. 5, 2021 (KR) .................. 10-2021-0087777
Jul. 5, 2021 (KR) .................. 10-2021-0087787
Sep. 14, 2021 (KR) .................. 10-2021-0122632

(51) Int. Cl.
  *H02K 1/22*  (2006.01)
  *H02K 9/22*  (2006.01)

(52) U.S. Cl.
  CPC .............. *H02K 9/22* (2013.01); *H02K 1/22* (2013.01)

(58) Field of Classification Search
  CPC .................................. H02K 1/22; H02K 9/22
  USPC .................................................. 310/216.001
  See application file for complete search history.

(56) References Cited

U.S. PATENT DOCUMENTS

| | | | | |
|---|---|---|---|---|
| 4,347,048 A * | 8/1982 | Kawabata | ............... | F04C 15/06 417/310 |
| 5,889,342 A * | 3/1999 | Hasebe | .................. | H02K 9/19 310/156.19 |
| 11,199,255 B2 * | 12/2021 | Kobayashi | .......... | F16H 61/0031 |
| 2002/0074888 A1 * | 6/2002 | Leger | .................... | H02K 31/00 310/178 |
| 2002/0122735 A1 * | 9/2002 | Bishop | ................. | F04C 2/3446 418/133 |
| 2003/0062780 A1 * | 4/2003 | Kaneko | .................... | H02K 3/24 310/58 |
| 2010/0194220 A1 * | 8/2010 | Tatematsu | ................ | H02K 1/32 310/61 |
| 2011/0135451 A1 * | 6/2011 | Tschuor | .................... | F02C 7/28 415/170.1 |
| 2012/0220379 A1 * | 8/2012 | Murakami | ............... | H02K 1/32 464/7 |
| 2016/0218573 A1 * | 7/2016 | Maekawa | ................ | H02K 1/28 |
| 2019/0181708 A1 * | 6/2019 | Maekawa | ............ | H02K 1/2766 |
| 2019/0229571 A1 * | 7/2019 | Yasuda | .................... | H02K 1/32 |

(Continued)

*Primary Examiner* — Rashad H Johnson
(74) *Attorney, Agent, or Firm* — NSIP Law

(57) ABSTRACT

Disclosed are a rotor plate and a rotor assembly including the same. The rotor plate includes a plate body including a first part having a first hole at a center, and a second part having a second hole at a center, the second part having a diameter corresponding to the first part, and connected to the first part in a first direction that is an axial direction perpendicular to the first part, and a diameter of the second hole is larger than a diameter of the first hole, a first slot recessed on an outer peripheral surface of the plate body, a second slot recessed on the outer peripheral surface of the plate body, and a first plate passage formed on a wall of the (Continued)

first part in the second direction that is opposite to the first direction, and connecting the first slot and the first hole.

19 Claims, 28 Drawing Sheets

(56) References Cited

U.S. PATENT DOCUMENTS

2023/0198342 A1\* 6/2023 Ichioka .................... B25F 5/00
310/68 B

\* cited by examiner

ROTOR PLATE AND ROTOR ASSEMBLY INCLUDING THE SAME

CROSS-REFERENCE TO RELATED APPLICATION

This application claims the benefits under 35 USC § 119(a) of Korean Patent Application Nos. 10-2021-0087787, 10-2021-0087777, and 10-2021-0122632, filed in the Korean Intellectual Property Office on Jul. 5, 2021, Jul. 5, 2021, and Sep. 14, 2021, respectively, the entire disclosure of which are incorporated herein by reference for all purposes.

BACKGROUND

1. Field

The present disclosure relates to a rotor plate, and a rotor assembly including the same.

2. Description of Related Art

A heat emission source of a motor for driving an electric vehicle is a coil, through which an electric current flows, and a core, through which a magnetic flux flows. During an operation of a motor, temperatures of corresponding components increase, and functions thereof become abnormal when the temperature rises are excessive. To prevent this, cooling schemes for cooling the motor are important, and the schemes for cooling the motor may include an oil cooling scheme of directly spraying oil to a heat emission source, a water cooling scheme of indirectly cooling a heat emission source by causing cooling water to flow a water passage part of a housing, and the like.

Among them, the oil cooling type cooling scheme of spraying oil to a heat emission source is a scheme of discharging oil from a pipe to cool a stator core and a coil. In the oil cooling type cooling scheme, because the number of components is large, it is difficult to directly cool a rotor core as the rotor core is covered by a rotor plate, a stator core/coil, and oil is not discharged from a pipe in all directions but is partially leaked from several holes, a cooling effect of an end coil part (a part including an end of the coil) of the highest temperature is degraded. Accordingly, to improve cooling performance, a structure capable of improving the cooling performance while not being complex is further necessary.

Meanwhile, the conventional rotor plate has a flat disk shape, and the sprayed oil cannot be delivered to the end coil well due to the shape, and a torque due to rotation of the rotor plate cannot be delivered to the oil well. Accordingly, the problem needs to be solved to improve a cooling performance of the motor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a rotor plate including a plate body including a first part having a first hole at a center thereof, and a second part having a second hole at a center thereof, the second part having a diameter corresponding to the first part, and connected to the first part in a first direction that is an axial direction perpendicular to the first part, and a diameter of the second hole is larger than a diameter of the first hole, a first slot recessed on an outer peripheral surface of the plate body, and a length of the first slot along the first direction being smaller than a length of the plate body along the first direction, a second slot recessed on the outer peripheral surface of the plate body, and a length of the second slot along the first direction corresponding to a length of the plate body along the first direction, and a first plate passage formed on a wall of the first part in a second direction that is opposite to the first direction, and connecting the first slot and the first hole.

A width of the first slot along a circumferential direction of the plate body may increase in the first direction.

A width of the second slot along a circumferential direction of the plate body may increase in the first direction.

The first slot may be opened in the first direction, and wherein the rotor plate may include a passage hole formed at a distal end of the first slot in the second direction, and connecting the first plate passage and the first slot.

A side wall of the first part in the second direction may include a peripheral area located in a radially outward direction of the first hole with respect to the passage hole.

The first slot may include a (1-1)-th surface facing a radially outward direction of the plate body, a (1-2)-th surface provided on one side of the (1-1)-th surface and connecting the outer peripheral surface of the plate body and the (1-1)-th surface, a (1-3)-th surface provided on an opposite side of the (1-1)-th surface and connecting the outer peripheral surface of the plate body and the (1-1)-th surface, and a (1-4)-th surface provided in the second direction of the (1-1)-th surface and connecting the (1-2)-th surface and the (1-3)-th surface.

The (1-2)-th surface and the (1-3)-th surface may be curved surfaces.

A (1-1)-th line may be a border line of the (1-1)-th surface and the (1-2)-th surface and a (1-2)-th line may be a border line of the (1-1)-th surface and the (1-3)-th surface are inclined with respect to the first direction.

A (1-1)-th line may be a border line of the (1-1)-th surface and the (1-2)-th surface and a (1-2)-th line may be a border line of the (1-1)-th surface and the (1-3)-th surface are curved lines.

A (1-3)-th line may be a border line of the outer peripheral surface and the (1-2)-th surface and a (1-4)-th line may be a border line of the outer peripheral surface and the (1-3)-th surface are inclined with respect to the first direction.

A (1-3)-th line may be a border line of the outer peripheral surface and the (1-2)-th surface and a (1-4)-th line may be a border line of the outer peripheral surface and the (1-3)-th surface are curved lines.

The second slot may include a (2-1)-th surface facing a radially outward direction of the plate body, a (2-2)-th surface provided on one side of the (2-1)-th surface and connecting the outer peripheral surface of the plate body and the (2-1)-th surface, and a (2-3)-th surface provided on an opposite side of the (2-1)-th surface and connecting the outer peripheral surface of the plate body and the (2-1)-th surface.

The (2-2)-th surface and the (2-3)-th surface may be curved surfaces.

The first slot and the second slot may be alternately arranged along a circumferential direction of the plate body.

The plate body may include a boss member protruding from a first area of the first part in a radially inward direction of the first hole, the first area may be an area that defines the first hole.

A diameter of the second hole may increase in the first direction.

In another general aspect, there is provided a rotor assembly including a rotor shaft extending in a first direction, and having a first passage extending in the first direction and a second passage communicated with an interior of the first passage, the second passage extending in a radially outward direction of the first passage, a rotor core disposed to surround an outer peripheral surface of the rotor shaft, and a rotor plate including a first plate passage disposed to surround the outer peripheral surface of the rotor shaft, extending in the radially outward direction, and communicated with the second passage, and a second plate passage bent at a distal end of the first plate passage in the radially outward direction.

The rotor plate may include a plate body, a first slot recessed on the outer peripheral surface of the plate body having a length along the first direction smaller than a length of the plate body along the first direction, and the first slot formed to be opened in the first direction, wherein the rotor plate may include a passage hole formed at a distal end of the first slot in a second direction, and connecting the first plate passage and the first slot, and wherein the second plate passage may be defined by the first slot.

The rotor core may include a core passage communicating with the first plate passage and extending along the first direction.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

Figure 1:
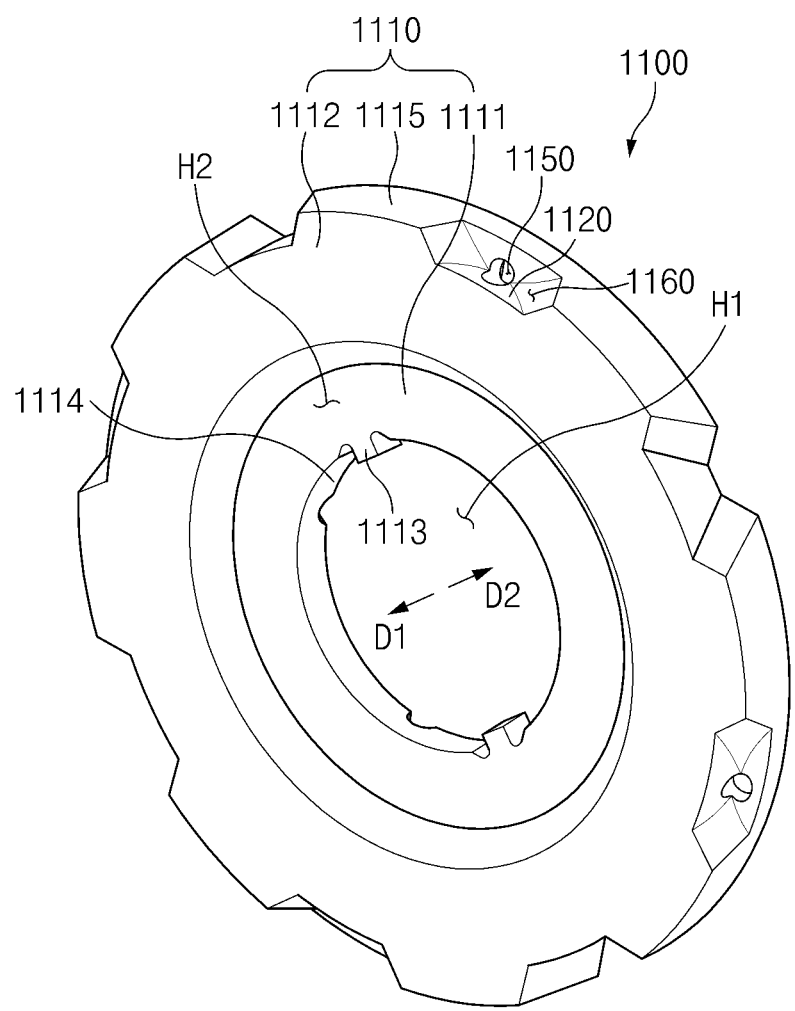
FIG. 1 is a perspective view illustrating a rotor plate according to a first embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

First Embodiment

Rotor Plate 1100

Figure 2:
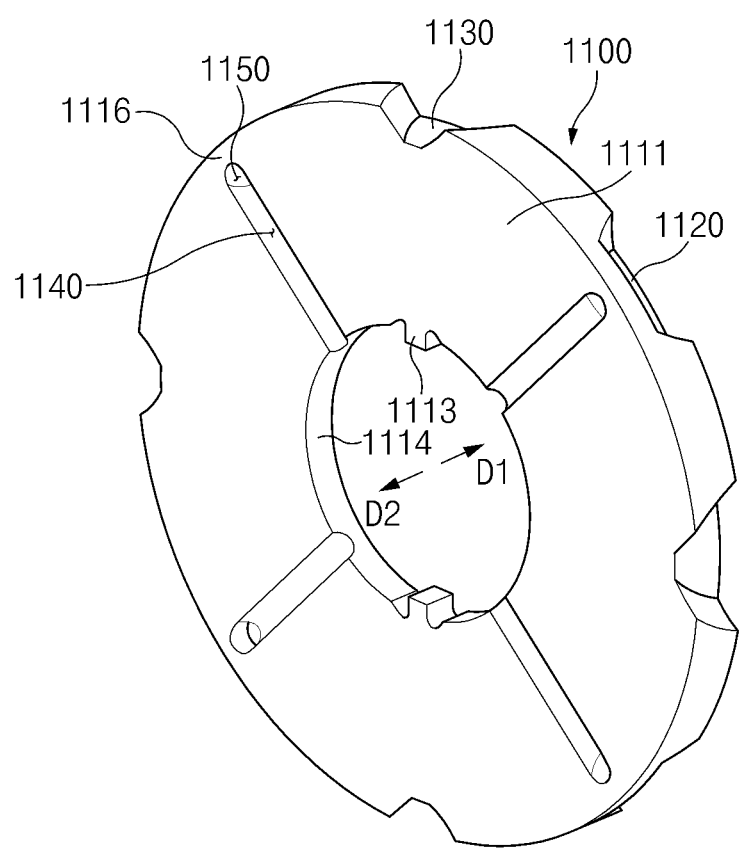
FIG. 2 is a perspective view illustrating the rotor plate according to the first embodiment of the present disclosure, when viewed in another direction.
Figure 3:
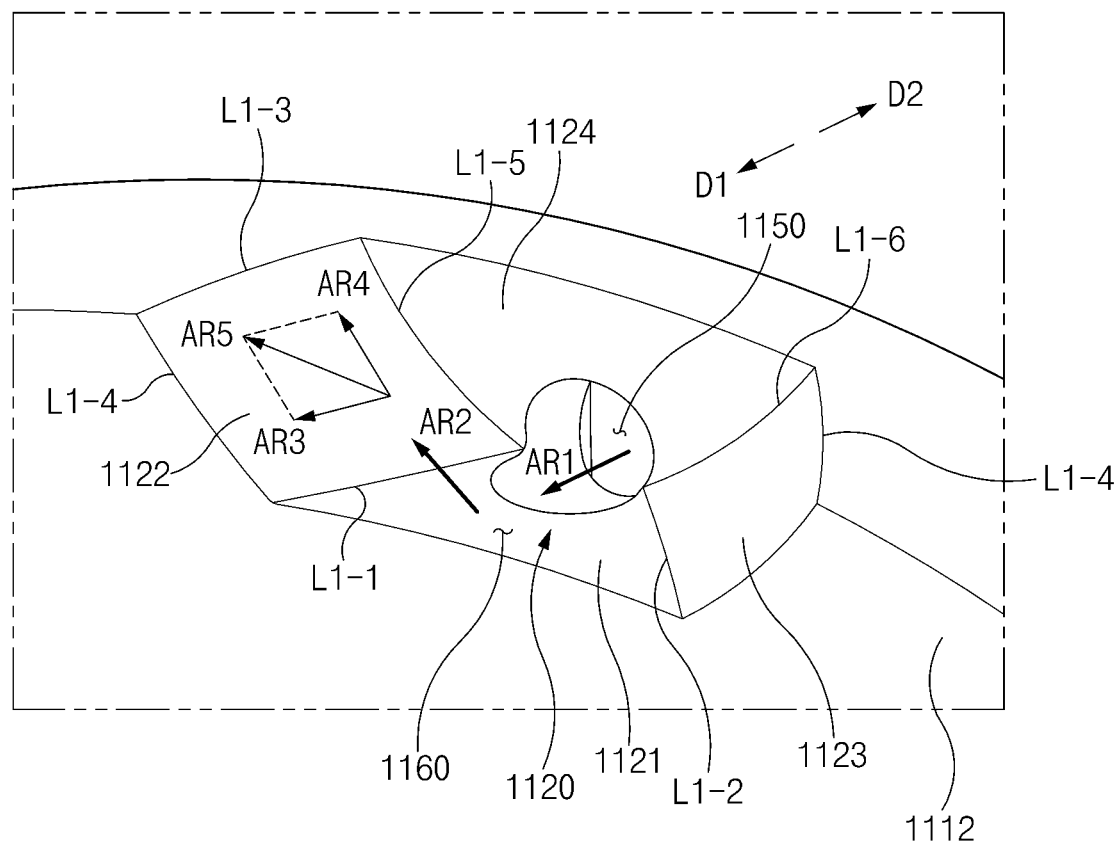
FIG. 3 is an enlarged view of a first slot part of FIG. 1.
Figure 4:
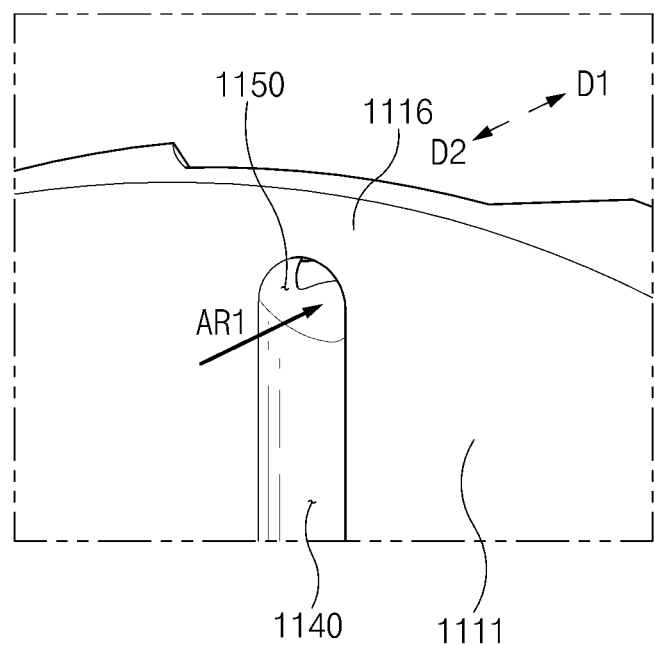
FIG. 4 is an enlarged view of a first slot part of FIG. 2.
Figure 5:
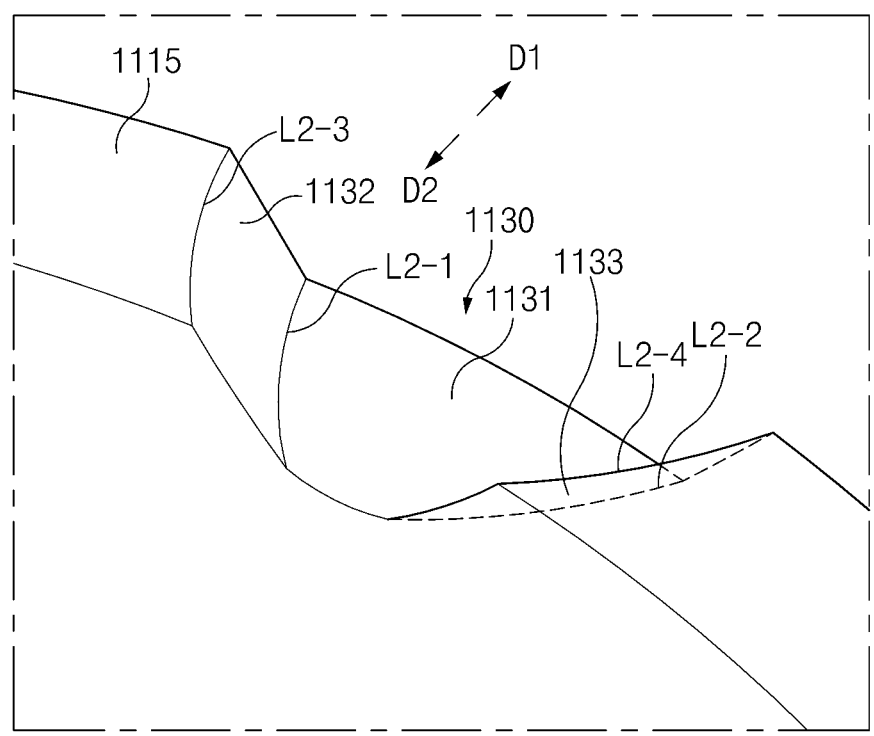
FIG. 5 is an enlarged view of a second slot part of FIG. 2.

FIG. 1 is a perspective view illustrating a rotor plate 1100 according to a first embodiment of the present disclosure. FIG. 2 is a perspective view illustrating the rotor plate 1100 according to the first embodiment of the present disclosure, when viewed in another direction. FIG. 3 is an enlarged view of a first slot 1120 part of FIG. 1. FIG. 4 is an enlarged view of the first slot 1120 part of FIG. 2. FIG. 5 is an enlarged view of a second slot (1130) part of FIG. 2.

The rotor plate 1100 according to the first embodiment of the present disclosure relates to a rotor plate used for a motor. As illustrated in FIGS. 1 and 2, the rotor plate 1100 according to the first embodiment of the present disclosure may include a plate body 1110, the first slot 1120, a second slot 1130, and a first plate passage 1140 (FIG. 2).

<Plate Body 1110>

The plate body 1110 may include a first part 1111 and a second part 1112. The first part 1111 may have a first hole H1 at a center thereof. The second part 1112 may have a second hole H2 at a center thereof. A diameter of the second hole H2 may be larger than a diameter of the first hole H1. Furthermore, the diameter of the second hole H2 may increase as it goes in a first direction D1.

Meanwhile, the second part 1112 has a diameter corresponding to the first part 1111, and may be connected to the first part 1111 in the first direction D1. Here, the first direction D1 may refer to one axial direction that is perpendicular to the first part 1111.

The plate body 1110 may include a boss member 1113. The boss member 1113 may protrude from a first area 1114 in a radially inward direction of the first hole H1. The first area 1114 may refer to an area that defines the first hole H1 of the first part 1111.

The pair of boss members 1113 may be provided. The boss member 1113 may be understood as an element, by which the plate body 1110 may be inserted into a shaft groove 1250 (FIG. 8) of a rotor shaft 1200 (FIG. 8) of a rotor assembly, which will be described below.

<First Slot 1120>

The first slot 1120 may be recessed on an outer peripheral surface 1115 of the plate body 1110. A length of the first slot 1120 along the first direction D1 may be smaller than a length of the plate body 1110 along the first direction D1. A plurality of first slots 1120 may be formed. The first slot 1120 may be connected to the first hole H1 by the first plate passage 1140.

<Second Slot 1130>

The second slot 1130 may be recessed on the outer peripheral surface 1115 of the plate body 1110. A length of the second slot 1130 along the first direction D1 may correspond to the length of the plate body 1110 along the first direction D1. A plurality of second slots 1130 may be formed.

Furthermore, the first slots 1120 and the second slots 1130 may be alternately arranged along a circumferential direction of the plate body 1110.

<First Plate Passage 1140>

The first plate passage 1140 may be formed on a wall of the first part 1111 in the second direction D2. The second direction D2 may refer to an opposite direction to the first direction D1. The first plate passage 1140 may connect the first slot 1120 and the first hole H1. That is, there are a plurality of first slots 1120, a plurality of second slots 1130, and a plurality of plate passages 1140, and the first plate passages 1140 may connect the first slots 1120 and the first hole H1.

<Passage Hole 1150>

The rotor plate 1100 according to the first embodiment of the present disclosure may further include the passage hole 1150. The passage hole 1150 may be formed at a distal end of the first slot 1120 in the second direction D2, and may connect the first plate passage 1140 and the first slot 1120.

Then, a wall of the first part 1111 in the second direction D2 may include a peripheral area 1116. The peripheral area 1116 may be an area that is located in a radially outward direction of the first hole H1 with respect to the passage hole 1150. This may mean that the first plate passage 1140 is formed within a radius of the plate body 1110.

<Second Plate Passage 1160>

As illustrated in FIG. 3, the rotor plate 1100 according to the first embodiment of the present disclosure may include the second plate passage 1160. The second plate passage 1160 may be bent at a distal end of the first plate passage 1140 in the radially outward direction. The second plate passage 1160 may refer to a passage that is communicated with the first slot 1120. That is, the second plate passage 1160 may be defined by the first slot 1120. The passage hole 1150 may be a connection point of the first plate passage 1140 and the second plate passage 1160.

The second plate passage 1160 may form flows that guide oil introduced through the first plate passage 1140 such that the oil becomes closer to an end coil EC. The flows are indicated by first arrows AR1 in FIGS. 3 and 6.

The rotor plate 1100 according to the first embodiment of the present disclosure may deliver the oil to the end coil (EC) (FIG. 6) well and deliver a torque due to rotation to the oil well due to the shape of the slot and the shape of the plate passage, and thus may enhance a cooling performance of the motor. Hereinafter, detailed shapes of the first slot 1120 and the second slot 1130, which may allow the above-mentioned contents, will be described in detail.

<Detailed Shape of First Slot 1120>

The first slot 1120 may be formed such that a width thereof along the circumferential direction of the plate body 1110 increases as it goes in the first direction D1. The first slot 1120 may be formed to be opened in the first direction D1.

In more detail, as illustrated in FIG. 3, the first slot 1120 may include a (1-1)-th surface 1121, a (1-2)-th surface 1122, a (1-3)-th surface 1123, and a (1-4)-th surface 1124. The (1-1)-th surface 1121 may be a surface that faces the radially outward direction of the plate body 1110. The (1-2)-th surface 1122 may be a surface that is provided on one side of the (1-1)-th surface 1121 in the circumferential direction of the plate body 1110 and connects the outer peripheral surface 1115 of the plate body 1110 and the (1-1)-th surface 1121. The (1-3)-th surface 1123 may be a surface that is provided on an opposite side of the (1-1)-th surface 1121 in the circumferential direction of the plate body 1110 and connects the outer peripheral surface 1115 of the plate body 1110 and the (1-1)-th surface 1121. The (1-4)-th surface 1124 may be a surface that is provided in the second direction D2 of the (1-1)-th surface 1121 and connects the (1-2)-th surface 1122 and the (1-3)-th surface 1123.

The (1-2)-th surface 1122 and the (1-3)-th surface 1123 may be curved surfaces. When the (1-2)-th surface 1122 and the (1-3)-th surface 1123 are the curved surfaces, the sliding thereof due to the oil is slight as compared with planar surfaces, and a higher torque may be delivered to the oil as compared with the planar surfaces. As the torque increases, a speed of the oil may increase. As heat transfer rate is proportional to a flow velocity of the oil, it may mean an enhancement of the cooling performance when the velocity of the oil increases.

Meanwhile, directions, which a (1-1)-th line L1-1 and a (1-2)-th line L1-2 in the first slot 1120 face, may be inclined with respect to the first direction D1. The (1-1)-th line L1-1 may be a border line of the (1-1)-th surface 1121 and the (1-2)-th surface 1122. The (1-2)-th line L1-2 may be a border line of the (1-1)-th surface 1121 and the (1-3)-th surface 1123. The (1-1)-th line L1-1 and the (1-2)-th line L1-2 may be curved lines.

Meanwhile, directions, which a (1-3)-th line L1-3 and a (1-4)-th line L1-4 in the first slot 1120 face, may be inclined with respect to the first direction D1. The (1-3)-th line L1-3 may be a border line of the outer peripheral surface 1115 of the plate body 1110 and the (1-2)-th surface 1122. The (1-4)-th line L1-4 may be a border line of the outer peripheral surface 1115 of the plate body 1110 and the (1-3)-th surface 1123. The (1-3)-th line L1-3 and the (1-4)-th line L1-4 may be curved lines.

Meanwhile, directions, which a (1-5)-th line L1-5 and a (1-6)-th line L1-6 in the first slot 1120 face, may be inclined with respect to the first direction D1. The (1-5)-th line L1-5 may be a border line of the (1-2)-th surface 1122 and the (1-4)-th surface 1124. The (1-6)-th line L1-6 may be a border line of the (1-3)-th surface 1123 and the (1-4)-th surface 1124. The (1-5)-th line L1-5 and the (1-6)-th line L1-6 may be curved lines.

<Flows of Oil in First Slot 1120>

Hereinafter, flows of the oil that collides with the first slot 1120 of the rotor plate 1100 according to the first embodiment of the present disclosure will be described in detail with reference to FIG. 3. This may mean flows of the oil after the oil flows in a direction of a first arrow AR1. Here, as an example, a case, in which the oil collides with the (1-2)-th surface 1122 as the rotor plate 1100 is rotated, will be described in detail.

Figure 6:
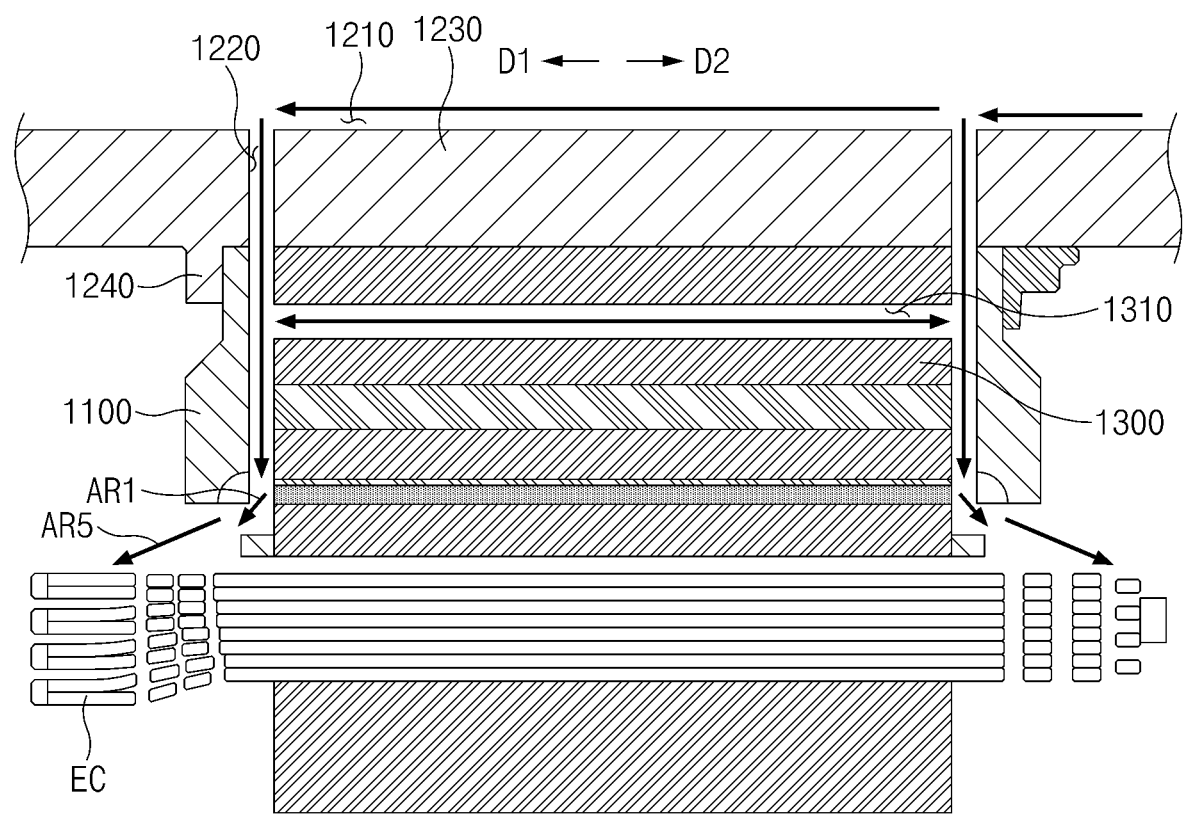
FIG. 6 is a cross-sectional view illustrating a rotor assembly including the rotor plate according to the first embodiment of the present disclosure.

A second arrow AR2 denoted by AR2 in FIG. 3 refers to a direction of an example, in which the oil collides with the rotor plate 1100 after passing through the passage hole 1150. Forces in a direction of a third arrow AR3 and a direction of a fourth arrow AR4 illustrated in FIG. 3 are applied to the oil that collides with the rotor plate 1100 due to the shape of the (1-2)-th surface 1122. As a result, the oil that collides with the rotor plate 1100 spatters in a direction of a fifth arrow AR5 that is a direction obtained by adding the direction, which the third arrow AR3 faces, and the direction, which the fourth arrow AR4 faces. As illustrated in FIG. 6, the direction of the fifth arrow AR5 may be a direction that faces the end coil EC.

<Detailed Shape of Second Slot 1130>

The second slot 1130 may be formed such that a width thereof along the circumferential direction of the plate body 1110 increases as it goes in the first direction D1.

In more detail, as illustrated in FIG. 5, the second slot 1130 may include a (2-1)-th surface 1131, a (2-2)-th surface 1132, and a (2-3)-th surface 1133. The (2-1)-th surface 1131 may be a surface that faces the radially outward direction of the plate body 1110. The (2-2)-th surface 1132 may be a surface that is provided on one side of the (2-1)-th surface 1131 in the circumferential direction of the plate body 1110 and connects the outer peripheral surface 1115 of the plate body 1110 and the (2-1)-th surface 1131. The (2-3)-th surface 1133 may be a surface that is provided on an opposite side of the (2-1)-th surface 1131 in the circumferential direction of the plate body 1110 and connects the outer peripheral surface 1115 of the plate body 1110 and the (2-1)-th surface 1131. The (2-2)-th surface 1132 and the (2-3)-th surface 1133 may be curved surfaces.

Meanwhile, directions, which a (2-1)-th line L2-1 and a (2-2)-th line L2-2 in the second slot 1130 face, may be inclined with respect to the first direction D1. The (2-1)-th line L2-1 may be a border line of the (2-1)-th surface 1131 and the (2-2)-th surface 1132. The (2-2)-th line L2-2 may be a border line of the (2-1)-th surface 1131 and the (2-3)-th surface 1133. The (2-1)-th line L2-1 and the (2-2)-th line L2-2 may be curved lines.

Meanwhile, directions, which a (2-3)-th line L2-3 and a (2-4)-th line L2-4 in the second slot 1130 face, may be inclined with respect to the first direction D1. The (2-3)-th line L2-3 may be a border line of the outer peripheral surface and the (2-2)-th surface 1132. The (2-4)-th line L2-4 may be a border line of the outer peripheral surface and the (2-3)-th surface 1133. The (2-3)-th line L2-3 and the (2-4)-th line L2-4 may be curved lines.

Rotor Assembly

Figure 7:
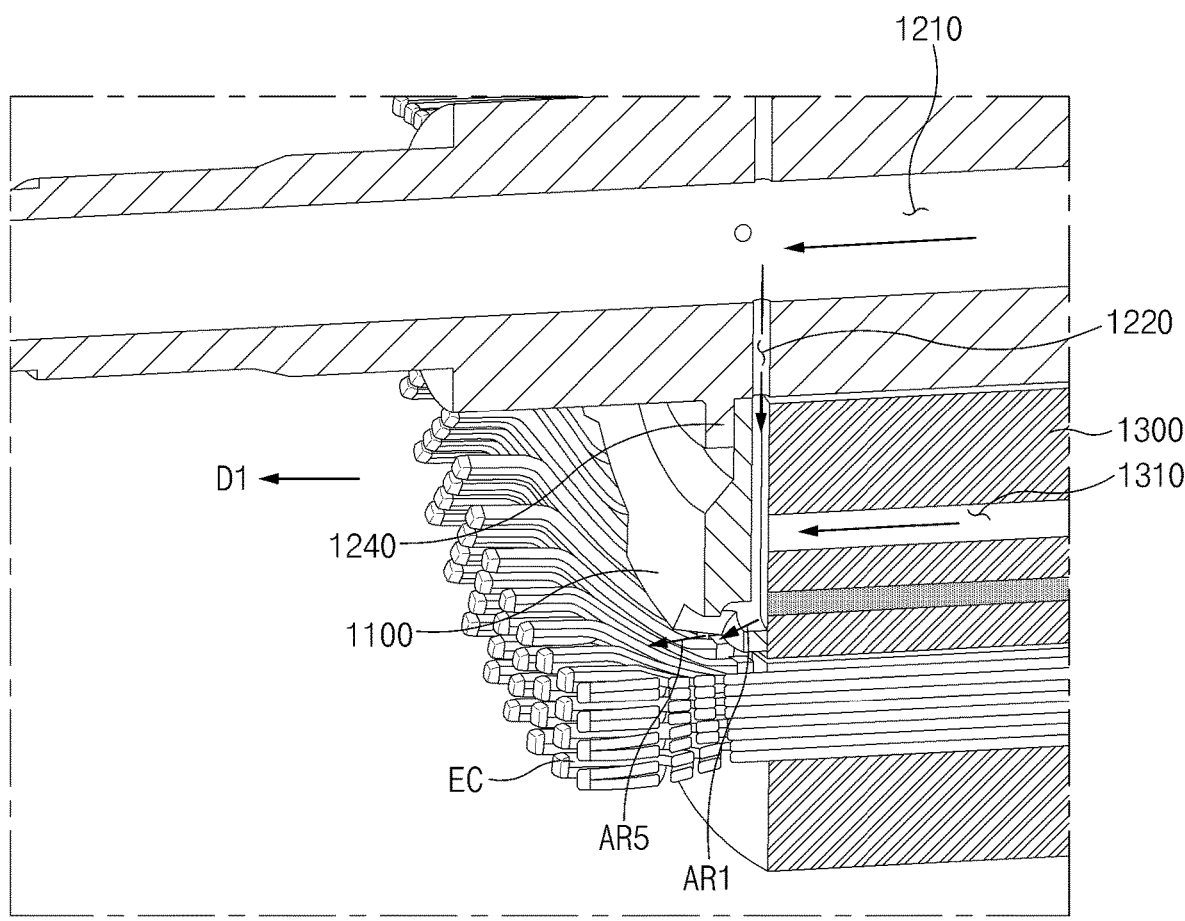
FIG. 7 is a partially enlarged perspective view illustrating the rotor assembly including the rotor plate according to the first embodiment of the present disclosure.
Figure 8:
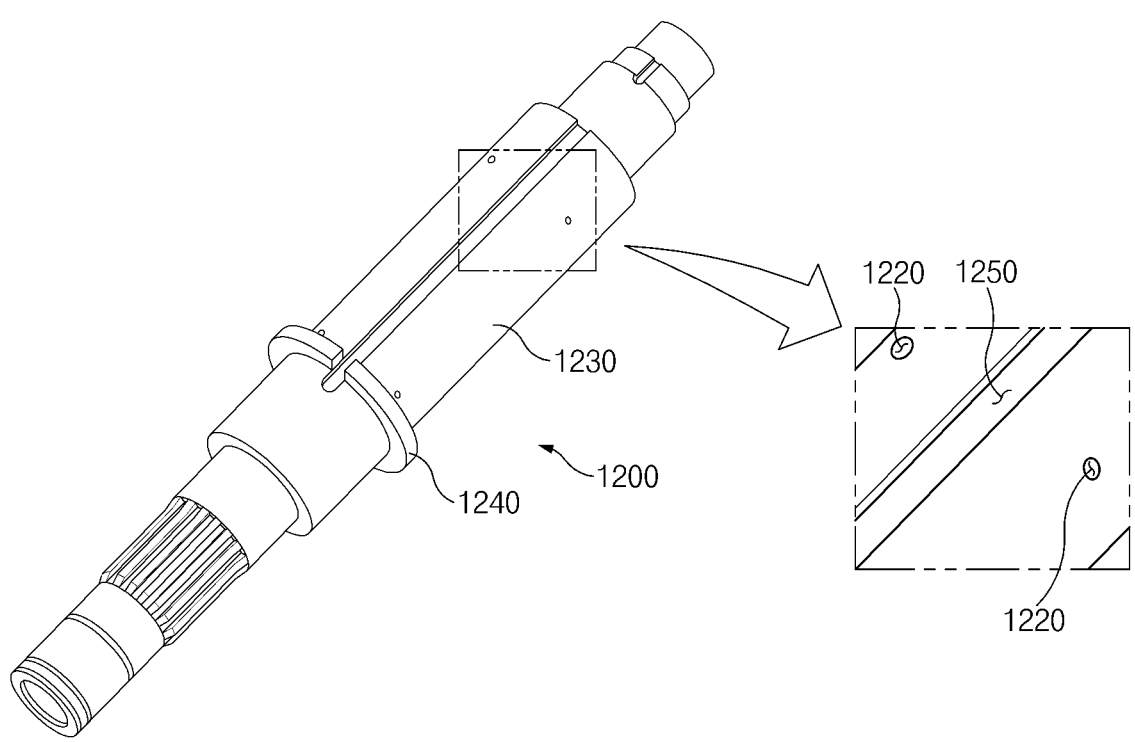
FIG. 8 is a perspective view illustrating a rotor shaft of the rotor assembly including the rotor plate according to the first embodiment of the present disclosure.
Figure 9:
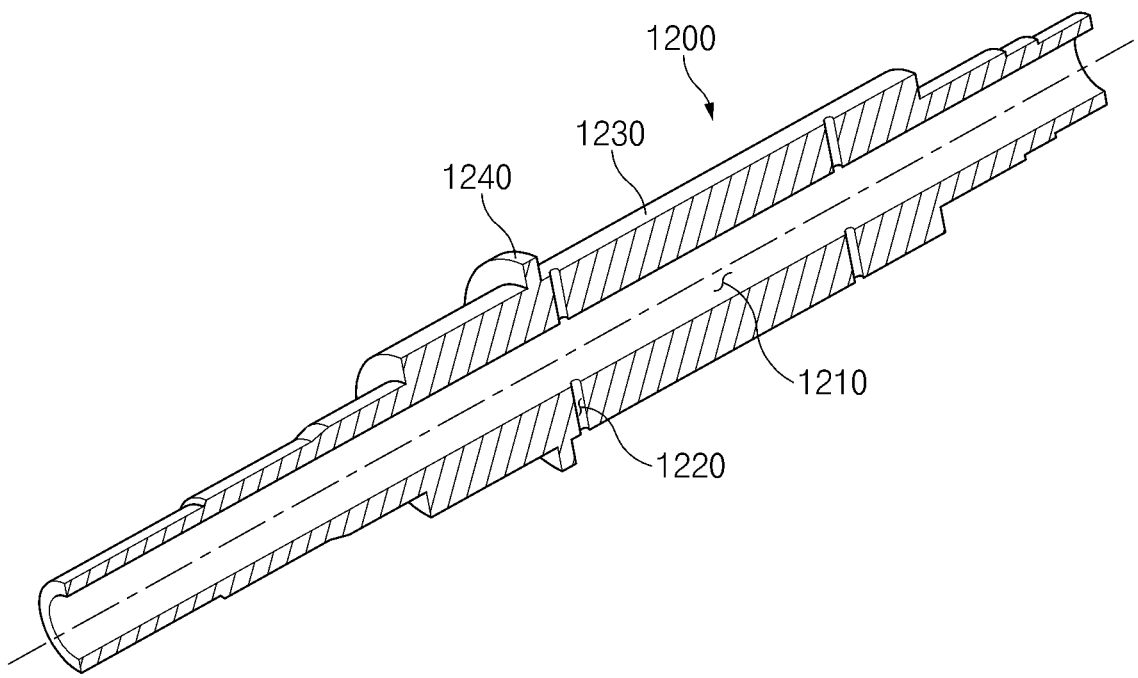
FIG. 9 is a cross-sectional view of FIG. 8.

FIG. 6 is a cross-sectional view illustrating the rotor assembly including the rotor plate 1100 according to the first embodiment of the present disclosure. FIG. 7 is a partially enlarged perspective view illustrating the rotor assembly including the rotor plate 1100 according to the first embodiment of the present disclosure. FIG. 8 is a perspective view illustrating the rotor shaft 1200 of the rotor assembly including the rotor plate 1100 according to the first embodiment of the present disclosure. FIG. 9 is a cross-sectional view of FIG. 8.

Hereinafter, the rotor assembly including the rotor plate 1100 according to the first embodiment will be described in detail with reference to FIGS. 6 and 9.

As illustrated in FIGS. 6 and 7, the rotor assembly may include the rotor plate 1100, the rotor shaft 1200, and a rotor core 1300.

The rotor plate 1100 may be disposed to surround the outer peripheral surface of the rotor shaft 1200, and may be disposed in an axial direction of the rotor core 1300. Here, the axial direction may be a concept that means any one of the first direction D1 or the second direction D2. In detail, the axial direction may refer to, among the first direction D1 and the second direction D2, a direction that faces an outside. As an example, in FIG. 7, the axial direction may coincide with the first direction D1.

The rotor plate 1100 may include the first plate passage 1140 and the second plate passage 1160. The above-mentioned contents may be referenced for a detailed description of the rotor plate 1100.

As illustrated in FIGS. 8 and 9, the rotor shaft 1200 may extend in the first direction D1. As illustrated in FIG. 9, the rotor shaft 1200 may include a first passage 1210 and a second passage 1220. The first passage 1210 may extend in the first direction D1. The second passage 1220 may extend in the radially outward direction of the first passage 1210 to be communicated with the first passage 1210.

As an example, as illustrated in FIG. 8, the rotor shaft 1200 may include a shaft body 1230 and a protruding member 1240. The first passage 1210 and the second passage 1220 may be formed in an interior of the shaft body 1230. The shaft groove 1250 may be formed in the shaft body 1230. The protruding member 1240 may protrude from one point of the shaft body 1230 in an axial direction of the second passage 1220 to a radially outward direction of the shaft body 1230.

As illustrated in FIGS. 6 and 7, the rotor core 1300 may be disposed to surround the outer peripheral surface of the rotor shaft 1200. The rotor core 1300 may include a core passage 1310. The core passage 1310 may be communicated with the first plate passage 1140, and may extend along an axial direction thereof. The oil may be introduced through the core passage 1310, and the rotor core 1300 may be cooled.

Hereinafter, the flows of the oil of the rotor assembly including the rotor plate 1100 according to the first embodiment of the present disclosure will be described in detail based on the above-mentioned contents.

First, the oil introduced through the first passage 1210 is discharged through the second passage 1220. In this process, the oil discharged through the second passage 1220 may be introduced into the core passage 1310 to cool the core, may be introduced through the first plate passage 1140 of the rotor plate 1100 to cool the rotor plate 1100, or may be directly introduced into the second slot 1130. Hereinafter, flow paths of the oil after the oil is introduced through the first plate passage 1140 will be described in detail.

Next, the oil introduced into the first plate passage 1140 passes through the passage hole 1150, and is introduced into the second plate passage 1160 along the direction of the first arrow AR1. Through this, the oil may flow closely to the end coil EC as compared with a case, in which the second plate passage 1160 is not present. Accordingly, in the rotor assembly including the rotor plate 1100 according to the first embodiment of the present disclosure, a probability of the oil reaching the end coil EC may be increased, and thus cooling performance may be enhanced as a surface area of the oil, which contacts the end coil EC increased such that heat transfer rate is increased.

Thereafter, the oil collides with the (1-2)-th surface 1122 or the (1-3)-th surface 1123 according to a rotational direction of the rotor plate 1100. In this process, as illustrated in FIG. 7, the oil is discharged in a direction of a fifth arrow AR5. Then, because the fifth arrow AR5 indicates a direction that faces the end coil EC, the end coil EC may be cooled in this process.

Second Embodiment

Rotor Plate 2100 According to Second Embodiment

Figure 10:
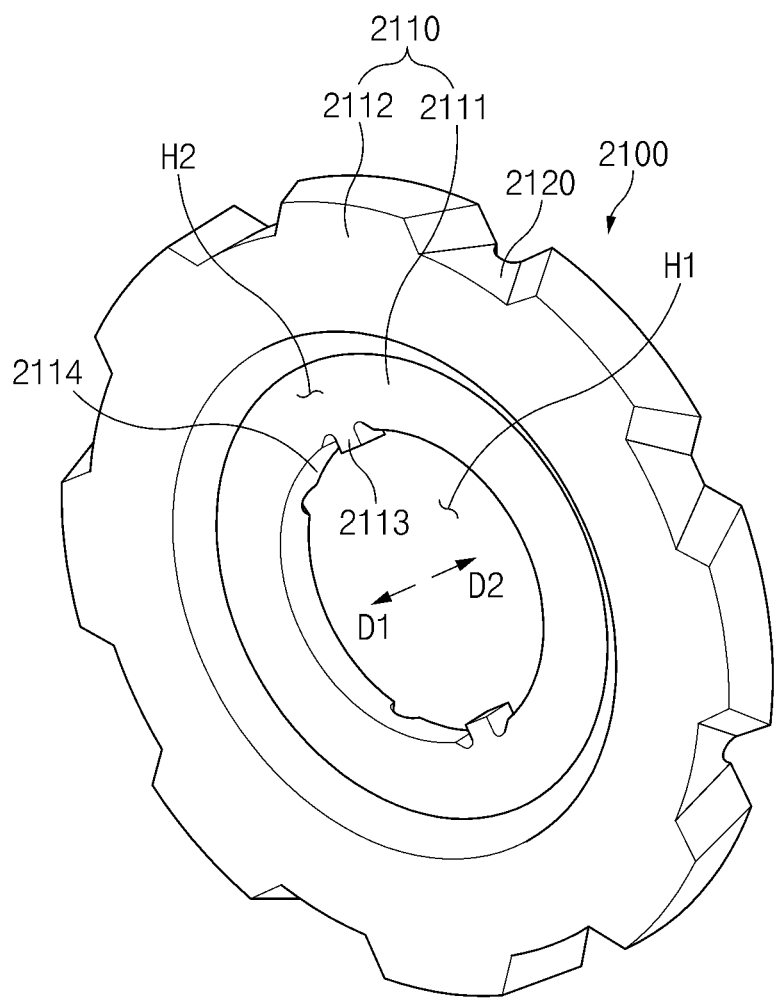
FIG. 10 is a perspective view illustrating a rotor plate according to a second embodiment of the present disclosure.
Figure 11:
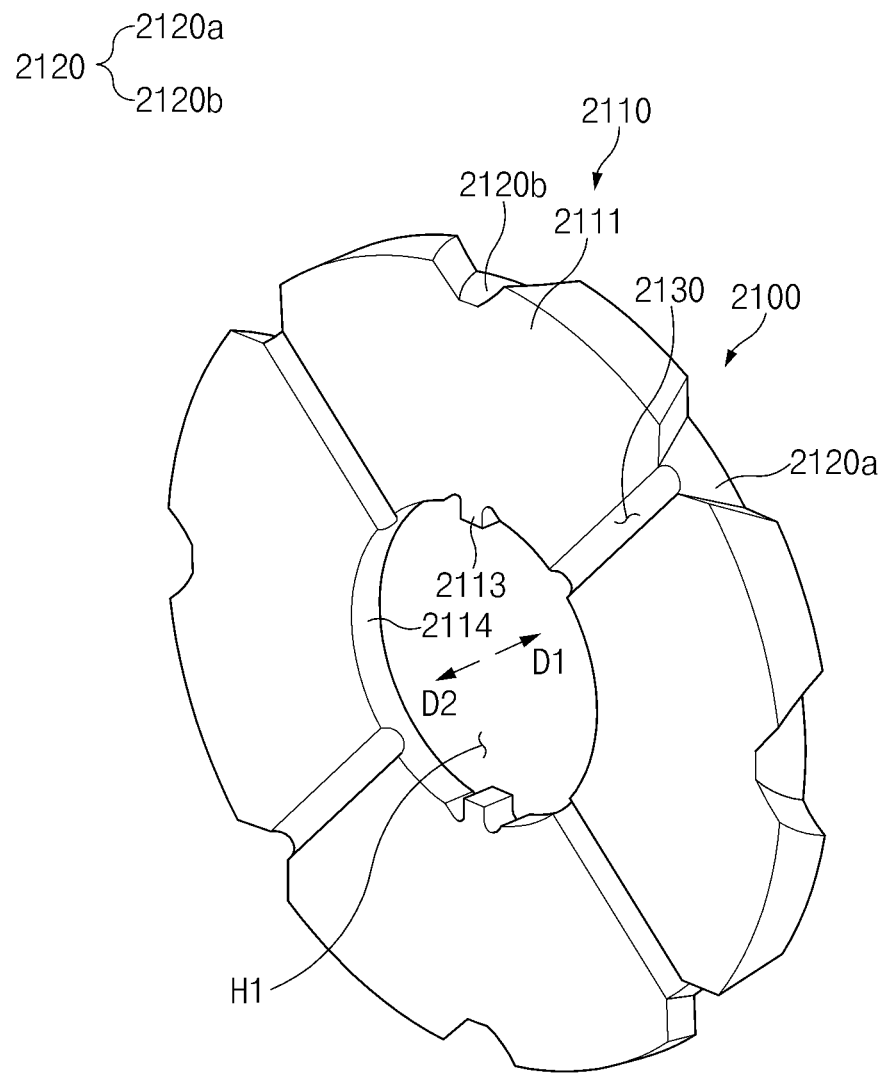
FIG. 11 is a perspective view illustrating the rotor plate according to the second embodiment of the present disclosure, when viewed in another direction.
Figure 12:
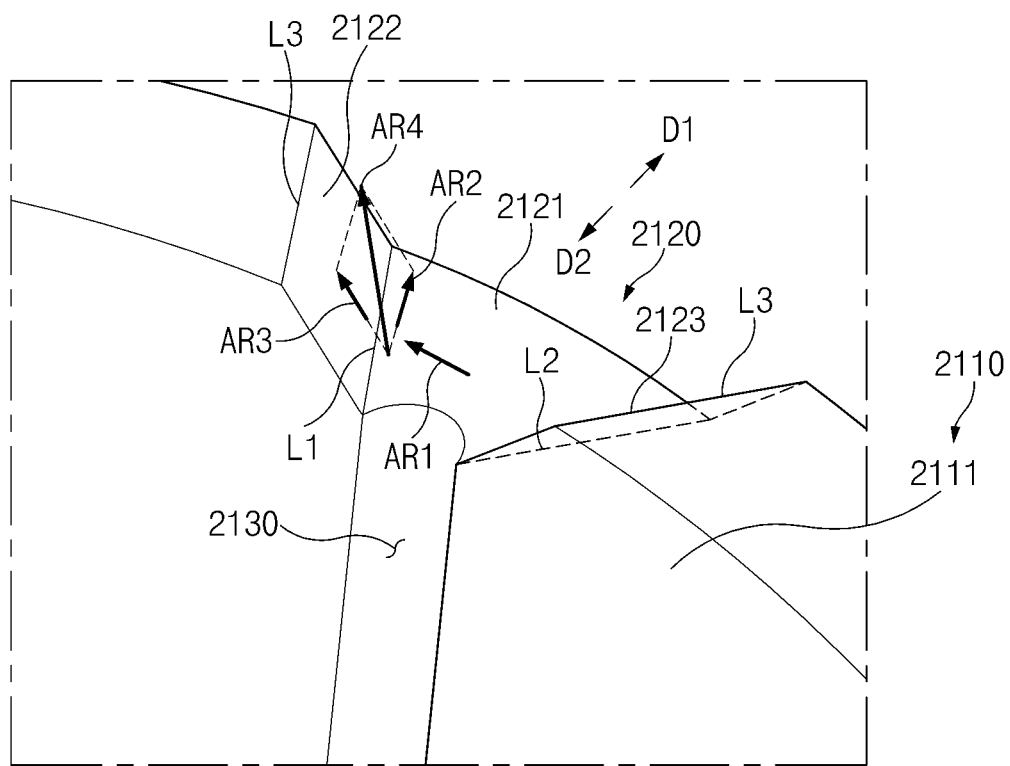
FIG. 12 is an enlarged view of FIG. 11.

FIG. 10 is a perspective view illustrating the rotor plate 2100 according to the second embodiment of the present disclosure. FIG. 11 is a perspective view illustrating the rotor plate 2100 according to the second embodiment of the present disclosure, when viewed in another direction. FIG. 12 is an enlarged view of FIG. 11.

The rotor plate 2100 according to the second embodiment of the present disclosure relates to a rotor plate used for a motor. As illustrated in FIGS. 10 and 11, the rotor plate 2100 according to the second embodiment of the present disclosure may include a plate body 2110, a slot 2120, and a plate passage 2130.

<Plate Body 2110>

The plate body 2110 may include a first part 2111 and a second part 2112. The first part 2111 may have a first hole H1 at a center thereof. The second part 2112 may have a second hole H2 at a center thereof. A diameter of the second hole H2 may be larger than a diameter of the first hole H1. Furthermore, the diameter of the second hole H2 may increase as it goes in a first direction D1.

Meanwhile, the second part 2112 has a diameter corresponding to the first part 2111, and may be connected to the first part 2111 in the first direction D1. Here, the first direction D1 may refer to one axial direction that is perpendicular to the first part 2111.

The plate body 2110 may include a boss member 2113. The boss member 2113 may protrude from a first area 2114 in a radially inward direction of the first hole H1. The first area 2114 may refer to an area that defines the first hole H1 of the first part 2111. The pair of boss members 2113 may be provided. The boss member 2113 may be understood as an element, by which the plate body 2110 may be inserted into a shaft groove 2250 (FIG. 18) of a rotor shaft 2200 (FIG. 18) of a rotor assembly, which will be described below.

<Slot 2120>

The slot 2120 may be recessed on an outer peripheral surface 2115 of the plate body 2110. A plurality of slots 2120 may be formed. That is, an overall shape of the rotor plate 2100 may be understood as a shape, such as a kind of a saw-tooth. A detailed shape of the slot 2120 will be described later.

<Plate Passage 2130>

The plate passage 2130 may be formed on a wall of the first part 2111 in the second direction D2. The second direction D2 may refer to an opposite direction to the first direction D1. The plate passage 2130 may connect some of the plurality of slots 2120 and the first hole H1. That is, a plurality of slots 2120 and a plurality of plate passages 2130 may be provided, and the plate passages 2130 may connect some of the plurality of slots 2120 and the first hole H1.

As an example, when it is assumed that the slots 2120 that are connected to the plate passage 2130 are connection slots 2120a and the slots 2120 that are not connected to the plate passage 2130 are non-connection slots 2120b, the connection slots 2120a and the non-connection slots 2120b may be alternately arranged along the circumferential direction of the plate body 2110.

The rotor plate 2100 according to the second embodiment of the present disclosure may deliver the oil to the end coil (EC) (FIG. 17) well and deliver a torque due to rotation to the oil well as it has the plurality of slots 2120, and thus may enhance a cooling performance of the motor. Hereinafter, a detailed shape of the slot 2120 that may allow the above-mentioned contents will be described in detail.

<Detailed Shape of Slot 2120>

The slot 2120 may be formed such that a width thereof along the circumferential direction of the plate body 2110 increases as it goes in the first direction D1.

In more detail, the slot 2120 may include first to third surfaces 2121, 2122, and 2123. The first surface 2121 may be a surface that faces the radially outward direction of the plate body 2110. The second surface 2122 may be a surface that is provided on one side of the first surface 2121 and connects the outer peripheral surface 2115 of the plate body 2110 and the first surface 2121. The third surface 2123 may be a surface that is provided on an opposite side of the first surface 2121 and connects the outer peripheral surface 2115 of the plate body 2110 and the first surface 2121.

Meanwhile, directions, which a first line L1 and a second line L2 in the slot 2120 face, may be inclined with respect to the first direction D1. The first line L1 may refer to a border line of the first surface 2121 and the second surface 2122. Furthermore, the second line L2 may refer to a border line of the first surface 2121 and the third surface 2123.

Furthermore, in the slot 2120, a third line L3 may be inclined with respect to the first direction D1. The third line L3 may refer to a border line of the outer peripheral surface 2115 of the plate body 2110 and the slot 2120. That is, the third line L3 may refer to a border line of the outer peripheral surface 2115 of the plate body 2110 and the second surface 2122 and a border line of the outer peripheral surface 2115 of the plate body 2110 and the third surface 2123.

Hereinafter, flows of the oil that collides with the rotor plate 2100 of the second embodiment of the present disclosure will be described in detail with reference to FIG. 12.

Here, as an example, a case, in which the oil collides with the second surface 2122 as the rotor plate 2100 is rotated, will be described in detail.

Figure 16:
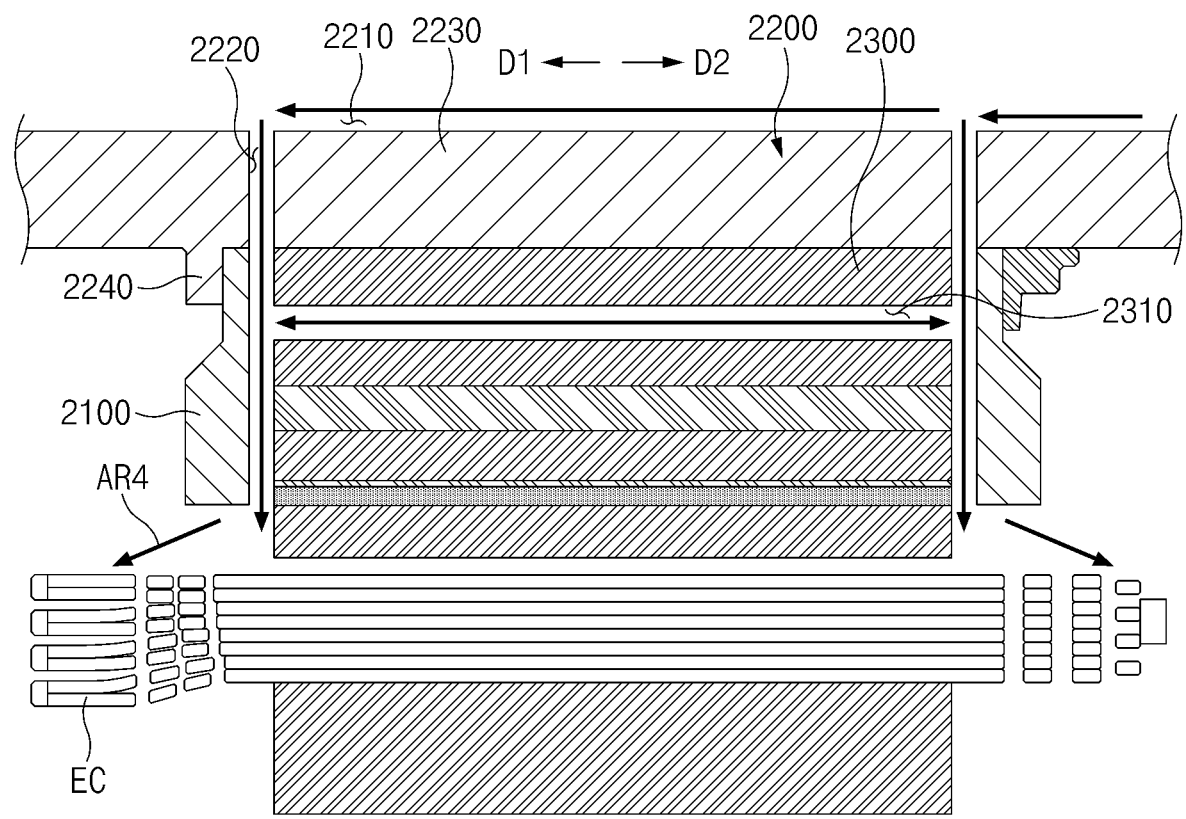
FIG. 16 is a cross-sectional view illustrating a rotor assembly including the rotor plate according to the second embodiment of the present disclosure.

The first arrow AR1 denoted by AR1 in FIG. 12 refers to a direction of an example, in which the oil collides with the rotor plate 2100. Forces in the direction of the second arrow AR2 and the direction of the third arrow AR3 illustrated in FIG. 12 are applied to the oil that collides with the rotor plate 2100 due to the shape of the second surface 2122. As a result, the oil that collides with the rotor plate 2100 spatters in the direction of the fourth arrow AR4 that is a direction obtained by adding the direction, which the second arrow AR2 faces, and the direction, which the third arrow AR3 faces. As illustrated in FIG. 16, the direction of the fourth arrow AR4 may be a direction that faces the end coil EC.

Third Embodiment

Figure 13:
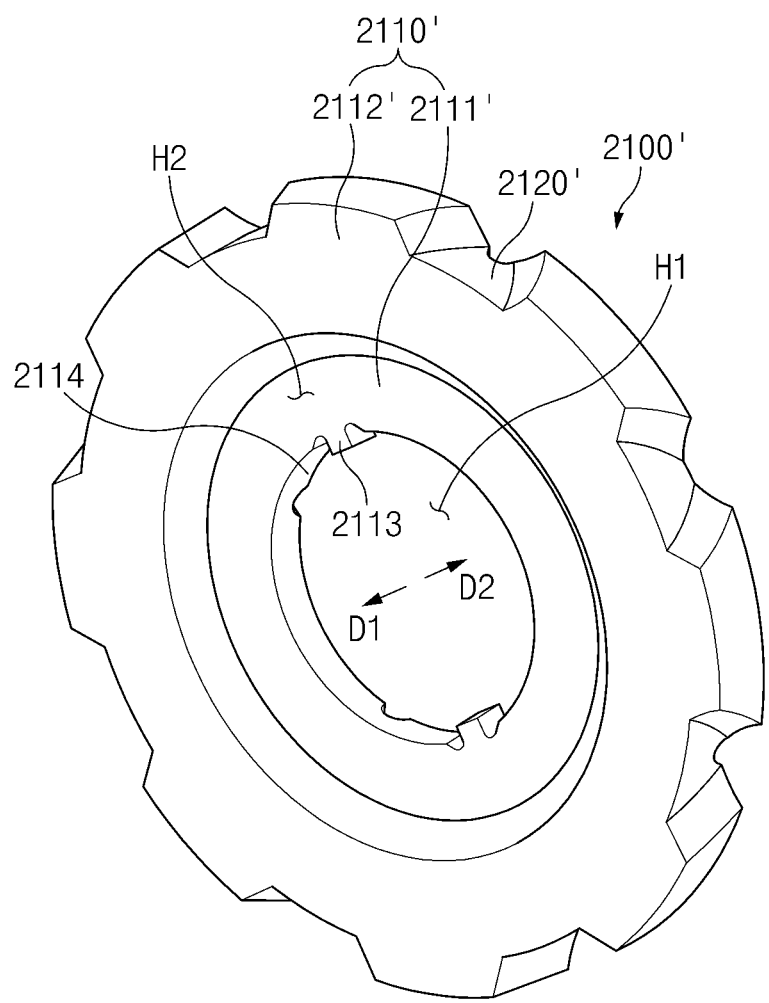
FIG. 13 is a perspective view illustrating a rotor plate according to a third embodiment of the present disclosure.
Figure 14:
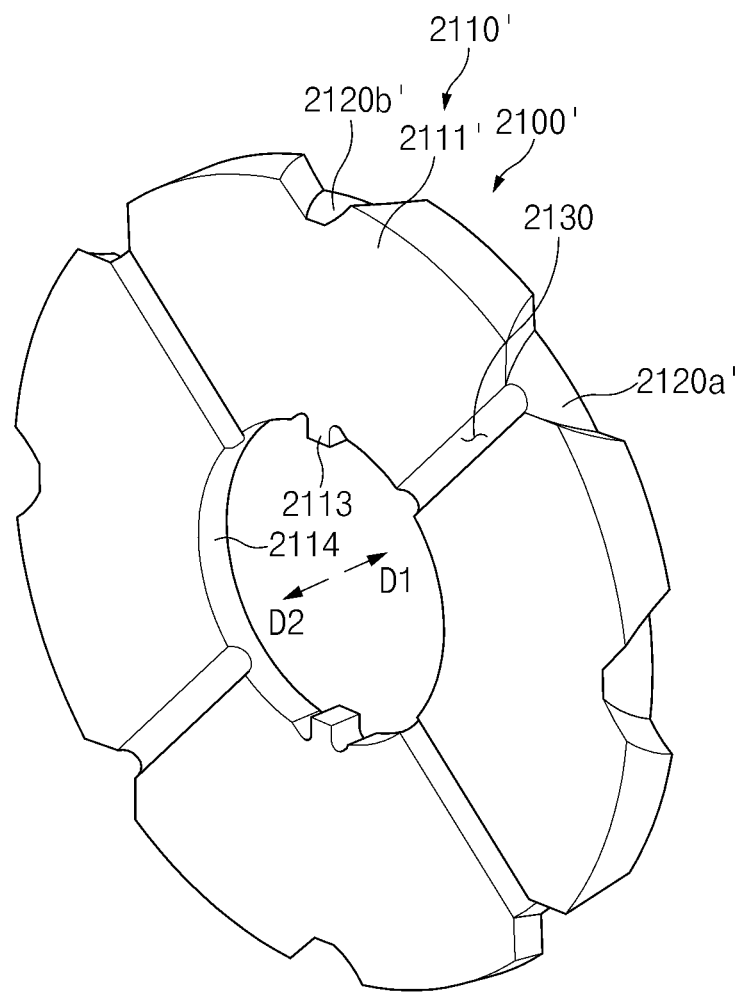
FIG. 14 is a perspective view illustrating the rotor plate according to the third embodiment of the present disclosure, when viewed in another direction.
Figure 15:
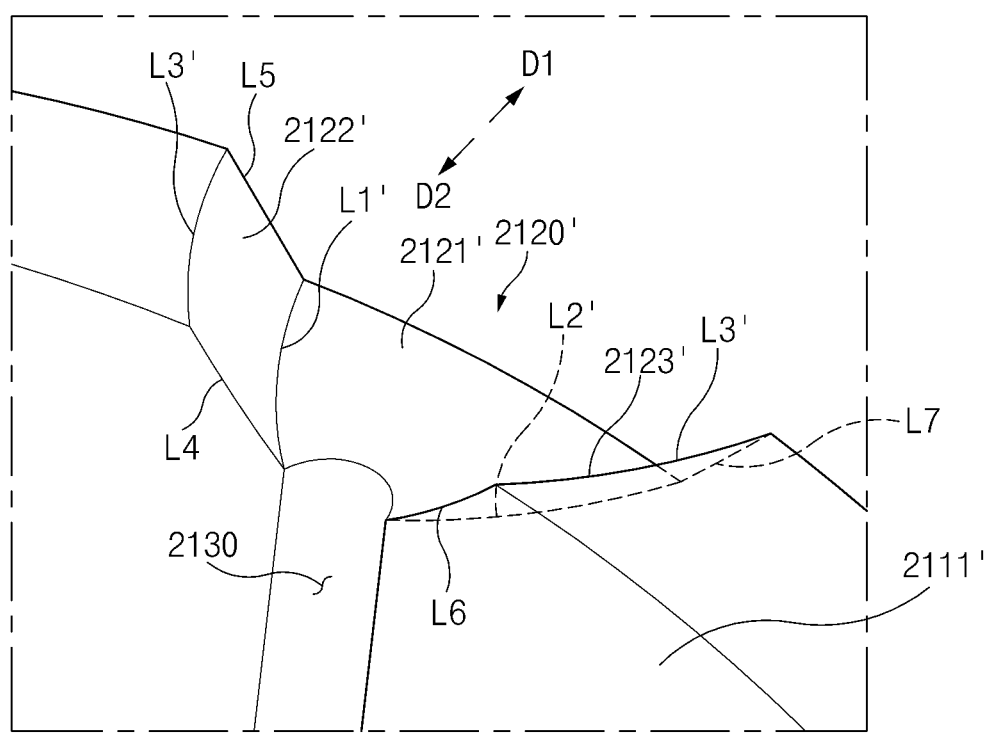
FIG. 15 is an enlarged view of FIG. 14.

FIG. 13 is a perspective view illustrating the rotor plate 2100' according to the third embodiment of the present disclosure. FIG. 14 is a perspective view illustrating the rotor plate 2100' according to the third embodiment of the present disclosure, when viewed in another direction. FIG. 15 is an enlarged view of FIG. 14. Hereinafter, the rotor plate 2100' according to the third embodiment of the present disclosure will be described with reference to FIGS. 13 to 15. The rotor plate 2100' according to the third embodiment is different from the rotor plate 2100 according to the second embodiment in a shape of a slot 2120'. The same or corresponding reference numerals are given to configurations that are the same as or correspond to those of the rotor plate 2100 according to the second embodiment, and a detailed description thereof will be omitted.

In the rotor plate 2100' according to the third embodiment of the present disclosure, a second surface 2122' may be a curved surface. Furthermore, a third surface 2123' may be a curved surface. Accordingly, shapes of a first part 2111' and a second part 2112' of the plate body 2110' of the rotor plate 2100' according to the third embodiment of the present disclosure may be formed to include curved lines.

Because the second surface 2122' and the third surface 2123' are the curved surface, a first line L1' that is a border line of the first surface 2121' and the second surface 2122' and a second line L2' that is a border line of the first surface 2121' and the third surface 2123' may be curved lines. Furthermore, a third line L3' may refer to a border line of the outer peripheral surface 2115 of the plate body 2110' and the slot 2120'.

Furthermore, a fourth line L4 that is a border line of the first part 2111' and the second surface 2122' and a fifth line L5 that is a border line of the second part 2112' and the second surface 2122' may be curved lines. Furthermore, a sixth line L6 that is a border line of the first part 2111' and the third surface 2123' and a seventh line L7 that is a border line of the second part 2112' and the third surface 2123' may be curved lines.

In the rotor plate 2100' according to the third embodiment of the present disclosure, the second surface 2122' and the third surface 2123' are the curved surfaces, the sliding of the oil may be slight as compared with the planar surfaces, and a higher torque may be delivered to the oil as compared with the planer surfaces. As the torque increases, a speed of the oil may increase. As heat transfer rate is proportional to a flow velocity of the oil, it may mean an enhancement of the cooling performance when the velocity of the oil increases.

Rotor Assembly of Rotor Plate 2100 According to Second Embodiment

Figure 17:
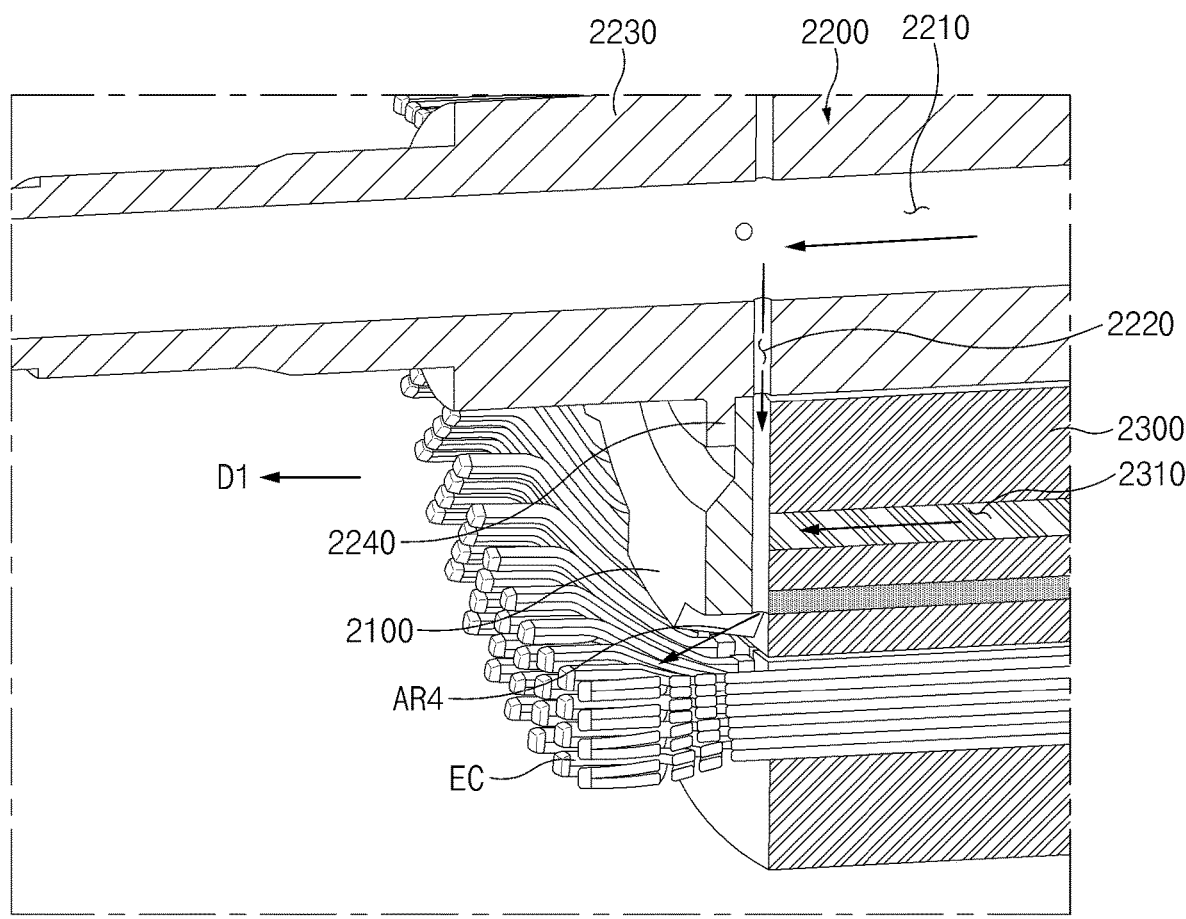
FIG. 17 is a partially enlarged perspective view illustrating the rotor assembly including the rotor plate according to the second embodiment of the present disclosure.
Figure 18:
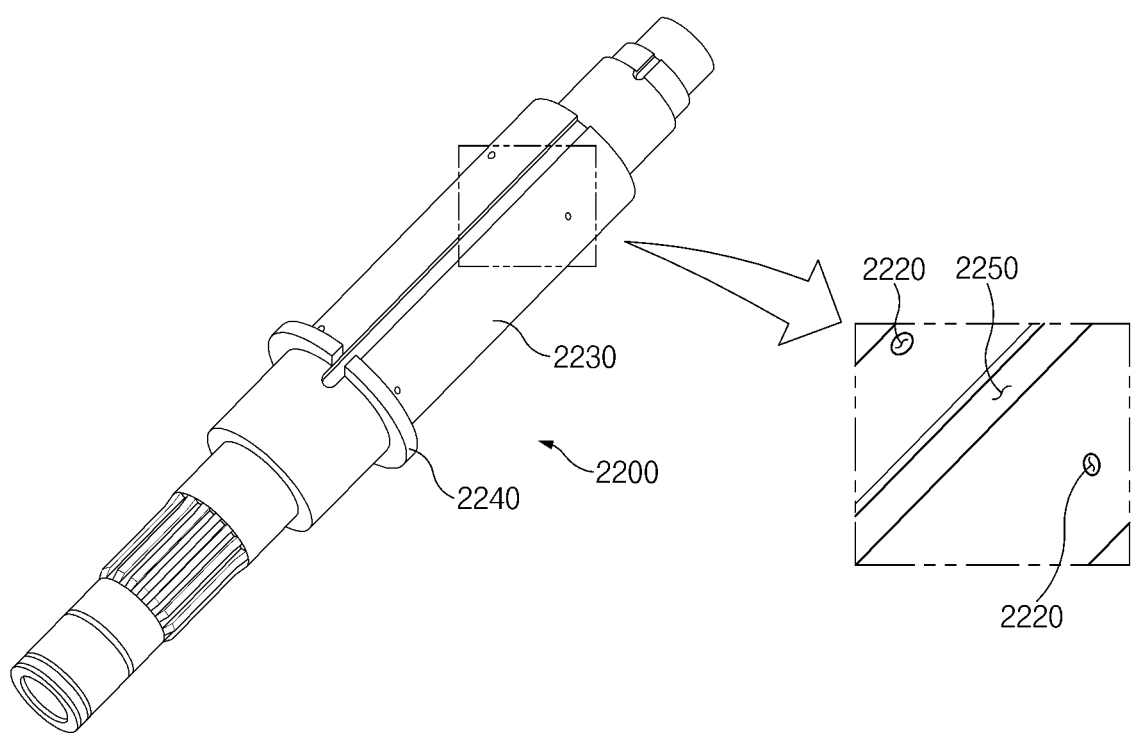
FIG. 18 is a perspective view illustrating a rotor shaft of the rotor assembly including the rotor plate according to the second embodiment of the present disclosure.
Figure 19:
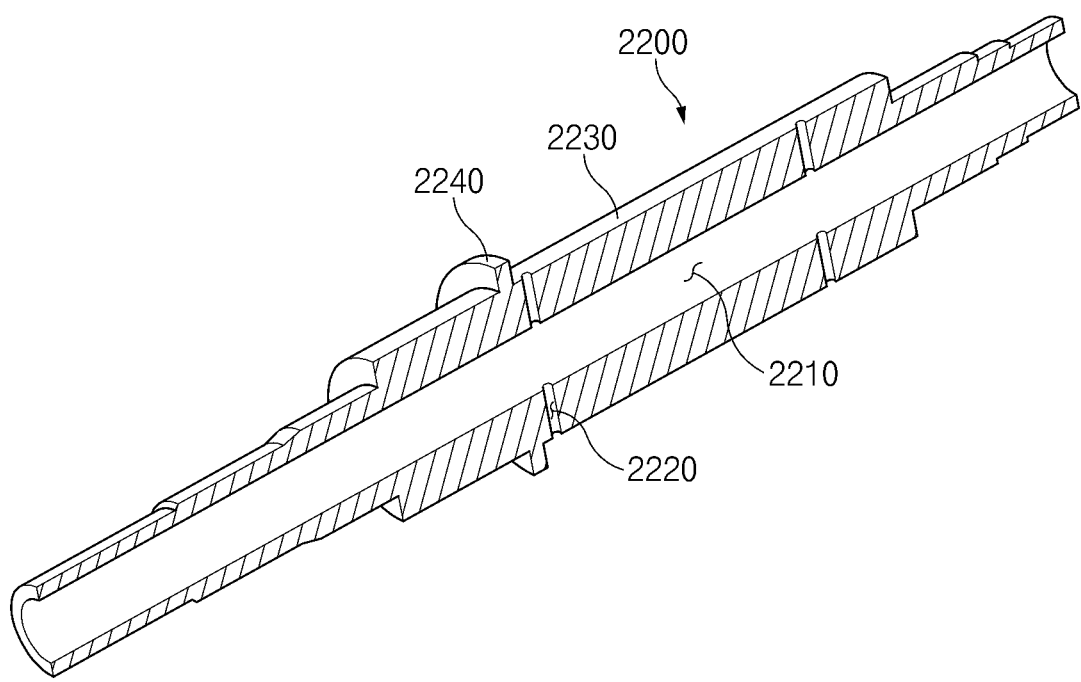
FIG. 19 is a cross-sectional view of FIG. 18.

FIG. 16 is a cross-sectional view illustrating the rotor assembly including the rotor plate 2100 according to the second embodiment of the present disclosure. FIG. 17 is a partially enlarged perspective view illustrating the rotor assembly including the rotor plate 2100 according to the second embodiment of the present disclosure. FIG. 18 is a perspective view illustrating the rotor shaft 2200 of the rotor assembly including the rotor plate 2100 according to the second embodiment of the present disclosure. FIG. 19 is a cross-sectional view of FIG. 18.

Hereinafter, the rotor assembly including the rotor plate 2100 according to the second embodiment will be described in detail with reference to FIGS. 16 to 19. All of the contents may be applied to the case of the rotor assembly including the rotor plate 2100' according to the third embodiment.

As illustrated in FIGS. 16 and 17, the rotor assembly may include the rotor plate 2100, the rotor shaft 2200, and a rotor core 2300.

The rotor plate 2100 may be disposed to surround the outer peripheral surface of the rotor shaft 2200, and may be disposed in an axial direction of the rotor core 2300. Here, the axial direction may be a concept that means any one of the first direction D1 or the second direction D2. In detail, the axial direction may refer to, among the first direction D1 and the second direction D2, a direction that faces an outside. As an example, in FIG. 17, the axial direction may coincide with the first direction D1.

The rotor plate 2100 may include the plate body 2110 and the plate passage 2130. The above-mentioned contents may be referenced for a detailed description of the rotor plate 2100.

As illustrated in FIGS. 18 and 19, the rotor shaft 2200 may extend in the first direction D1. The rotor shaft 2200 may include a first passage 2210 and a second passage 2220. The first passage 2210 may extend in the first direction D1. The second passage 2220 may extend in the radially outward direction of the first passage 2210 to be communicated with the first passage 2210.

As an example, the rotor shaft 2200 may include a shaft body 2230 and a protruding member 2240. The first passage 2210 and the second passage 2220 may be formed in an interior of the shaft body 220. The shaft groove 2250 may be formed in the shaft body 2230. The protruding member 2240 may protrude from one point of the shaft body 2230 in an axial direction of the second passage 2230 to a radially outward direction of the shaft body 2230.

The rotor core 2300 may be disposed to surround the outer peripheral surface of the rotor shaft 2200. The rotor core 2300 may include a core passage 2310. The core passage 2310 may be communicated with the plate passage 2130, and may extend along an axial direction thereof. The oil may be introduced through the core passage 2310, and the rotor core 2300 may be cooled.

Hereinafter, the flows of the oil of the rotor assembly including the rotor plate 2100 according to the second embodiment of the present disclosure will be described in detail based on the above-mentioned contents.

First, the oil introduced through the first passage 2210 is discharged through the second passage 2220. In this process, the oil discharged through the second passage 2220 may be introduced into the core passage 2310 to cool the core, or may be introduced through the plate passage 2130 of the rotor plate 2100 to cool the rotor plate 2100.

Next, the oil introduced into the plate passage 2130 collides the second surface 2122 or the third surface 2123 according to the rotational direction of the rotor plate 2100. In this process, as illustrated in FIG. 16, the oil is discharged in the direction of the fourth arrow AR4. Then, because the fourth arrow AR4 indicates a direction that faces the end coil EC, the end coil EC may be cooled in this process.

Fourth Embodiment

Rotor Plate 3100 According to Fourth Embodiment

Figure 20:
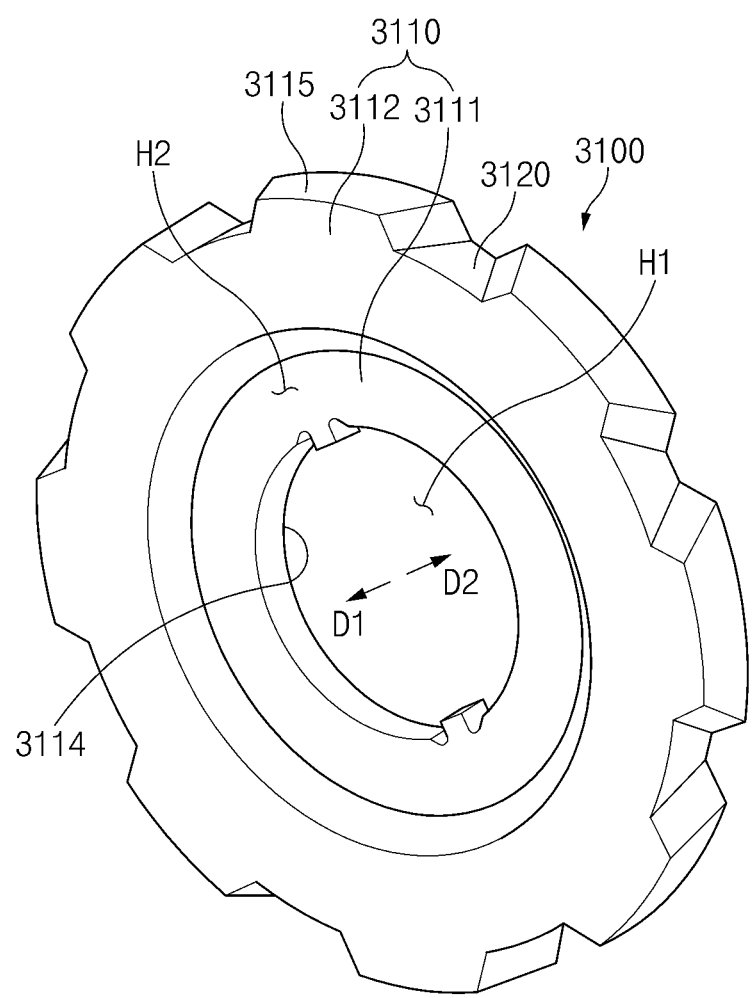
FIG. 20 is a perspective view illustrating a rotor plate according to a fourth embodiment of the present disclosure.
Figure 21:
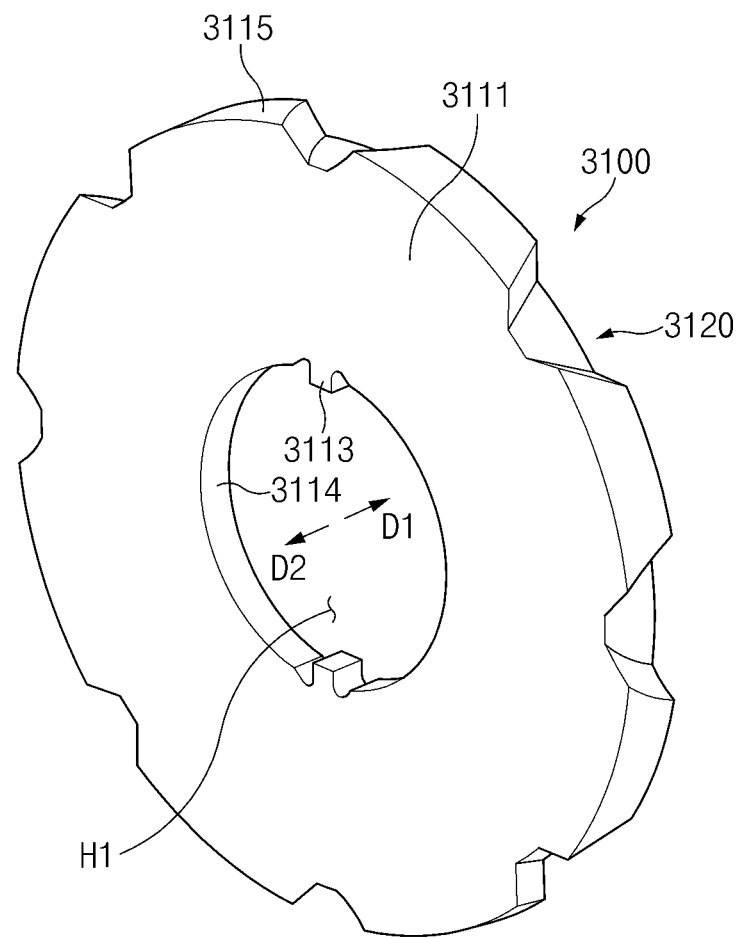
FIG. 21 is a perspective view illustrating the rotor plate according to the fourth embodiment of the present disclosure, when viewed in another direction.
Figure 22:
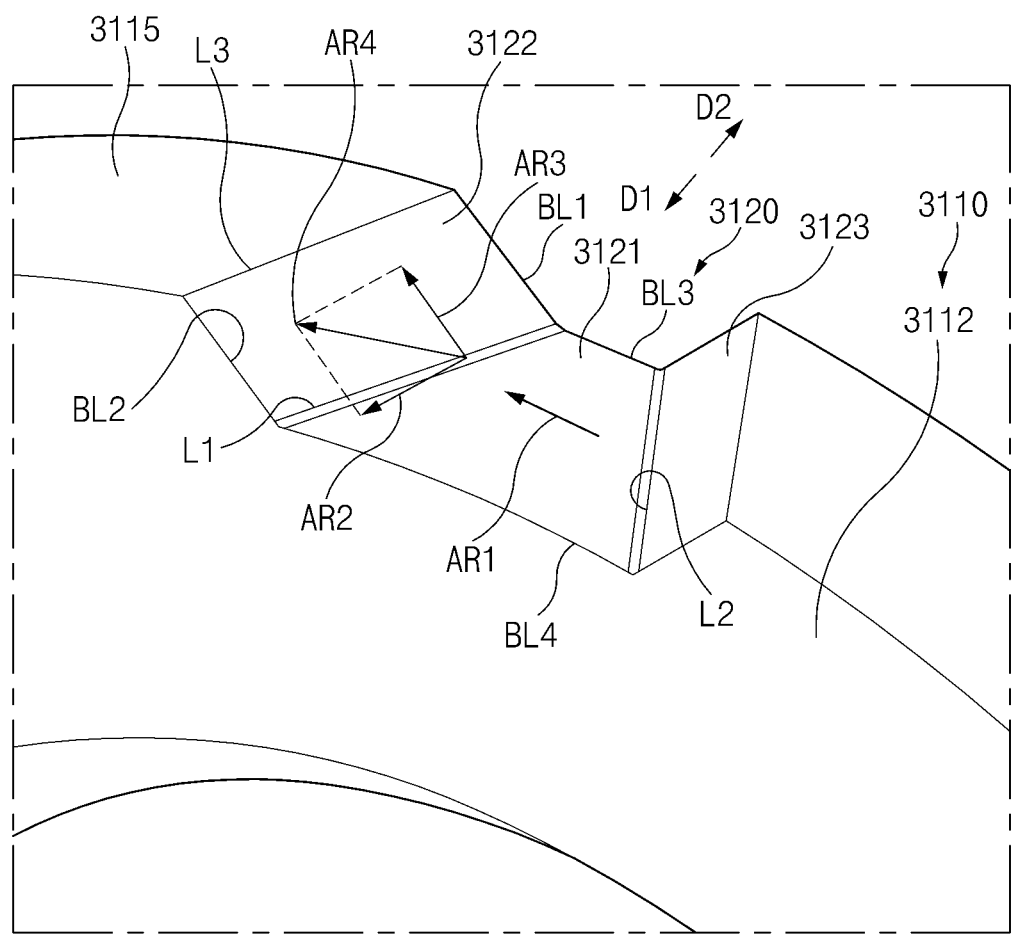
FIG. 22 is an enlarged view of FIG. 20.

FIG. 20 is a perspective view illustrating the rotor plate 3100 according to the fourth embodiment of the present disclosure. FIG. 21 is a perspective view illustrating the rotor plate 3100 according to the fourth embodiment of the present disclosure, when viewed in another direction. FIG. 22 is an enlarged view of FIG. 20.

The rotor plate 3100 according to the fourth embodiment of the present disclosure relates to a rotor plate used for a motor. As illustrated in FIGS. 20 and 21, the rotor plate 3100 according to the fourth embodiment of the present disclosure may include a plate body 3110, a slot 3120, and a plate passage 3130.

<Plate Body 3110>

The plate body 3110 may include a first part 3111 and a second part 3112. The first part 3111 may have a first hole H1 at a center thereof. The second part 3112 may have a second hole H2 at a center thereof. A diameter of the second hole H2 may be larger than a diameter of the first hole H1. Furthermore, the diameter of the second hole H2 may increase as it goes in a first direction D1.

Meanwhile, the second part 3112 has a diameter corresponding to the first part 3111, and may be connected to the first part 3111 in the first direction D1. Here, the first direction D1 may refer to one axial direction that is perpendicular to the first part 3111.

The plate body 3110 may include a boss member 3113. The boss member 3113 may protrude from a first area 3114 in a radially inward direction of the first hole H1. The first area 3114 may refer to an area that defines the first hole H1 of the first part 3111.

The pair of boss members 3113 may be provided. The boss member 3113 may be understood as an element, by which the plate body 3110 may be inserted into a shaft groove 3240 (FIG. 27) of a rotor shaft 3200 (FIG. 27) of a rotor assembly, which will be described below.

As illustrated in FIG. 20, a pair of boss members 3113 may be provided. The pair of boss members may be provided to face each other while the first hole H1 being interposed therebetween.

<Slot 3120>

The slot 3120 may be recessed on the outer peripheral surface 3115 of the plate body 3110. A plurality of slots 3120 may be formed. The plurality of slots may be arranged on the outer peripheral surface 3115 at a specific interval. That is, an overall shape of the rotor plate 3100 may be understood as a shape, such as a kind of a saw-tooth. A detailed shape of the slot 3120 will be described later.

The rotor plate 3100 according to the fourth embodiment of the present disclosure may deliver the oil to the end coil (EC) (FIG. 26) well and deliver a torque due to rotation to the oil well as it has the plurality of slots 3120, and thus may enhance a cooling performance of the motor. Hereinafter, a detailed shape of the slot 3120 that may allow the above-mentioned contents will be described in detail.

<Detailed Shape of Slot 3120>

The slot 3120 may be formed such that a width thereof along the circumferential direction of the plate body 3110 increases as it goes in the first direction D1.

In more detail, the slot 3120 may include first to third surfaces 3121, 3122, and 3123. The first surface 3121 may be a surface that faces the radially outward direction of the plate body 3110. The second surface 3122 may be a surface that is provided on one side of the first surface 3121 and connects the outer peripheral surface 3115 of the plate body 3110 and the first surface 3121. The third surface 3123 may be a surface that is provided on an opposite side of the first surface 3121 and connects the outer peripheral surface 3115 of the plate body 3110 and the first surface 3121.

Meanwhile, directions, which a first line L1 and a second line L2 in the slot 3120 face, may be inclined with respect to the first direction D1. The first line L1 may refer to a border line of the first surface 3121 and the second surface 3122. Furthermore, the second line L2 may refer to a border line of the first surface 3121 and the third surface 3123.

Furthermore, in the slot 3120, a third line L3 may be inclined with respect to the first direction D1. The third line L3 may refer to a border line of the outer peripheral surface 3115 of the plate body 3110 and the slot 3120. That is, the third line L3 may refer to a border line of the outer peripheral surface 3115 of the plate body 3110 and the second surface 3122 and a border line of the outer peripheral surface 3115 of the plate body 3110 and the third surface 3123.

As described above, a pair of third lines L3 may be formed. Among the pair of the third lines, the third line that is adjacent to the first line L1, and the first line L1 may be parallel to each other. Among the pair of the third lines, the third line that is adjacent to the second line L2, and the second line L2 may be parallel to each other.

Furthermore, a first border line BL1 that is a border line of a surface of the first part 3111, which faces the second direction D2 that is opposite to the first direction D1 and the second surface 3122, and a second border line BL2 that is a border line of a surface of the second part 3112, which faces the first direction D1, and the second surface 3122 may be inclined with respect to the first direction. Likewise, the contents also may be applied to a border line of a surface of the first part 3111, which faces the second direction D2, and the third surface 3123, and a border line of a surface of the second part 3112, which faces the first direction D1, and the third surface 3123.

Furthermore, a length of a third border line BL3 that is a border line of the first surface 3121 and a surface of the first part 3111, which faces the second direction D2, may be smaller than a length of a fourth border line BL4 that is a border line of the first surface 3121 and a surface of the second part 3112, which faces the first direction D1.

Hereinafter, flows of the oil that collides with the rotor plate 3100 of the fourth embodiment of the present disclosure will be described in detail with reference to FIG. 22. Here, as an example, a case, in which the oil collides with the second surface 3122 as the rotor plate 3100 is rotated, will be described in detail. Here, the oil may be an oil that is discharged from an oil pipe, or an oil that is filled in an interior of an existing motor.

Figure 26:
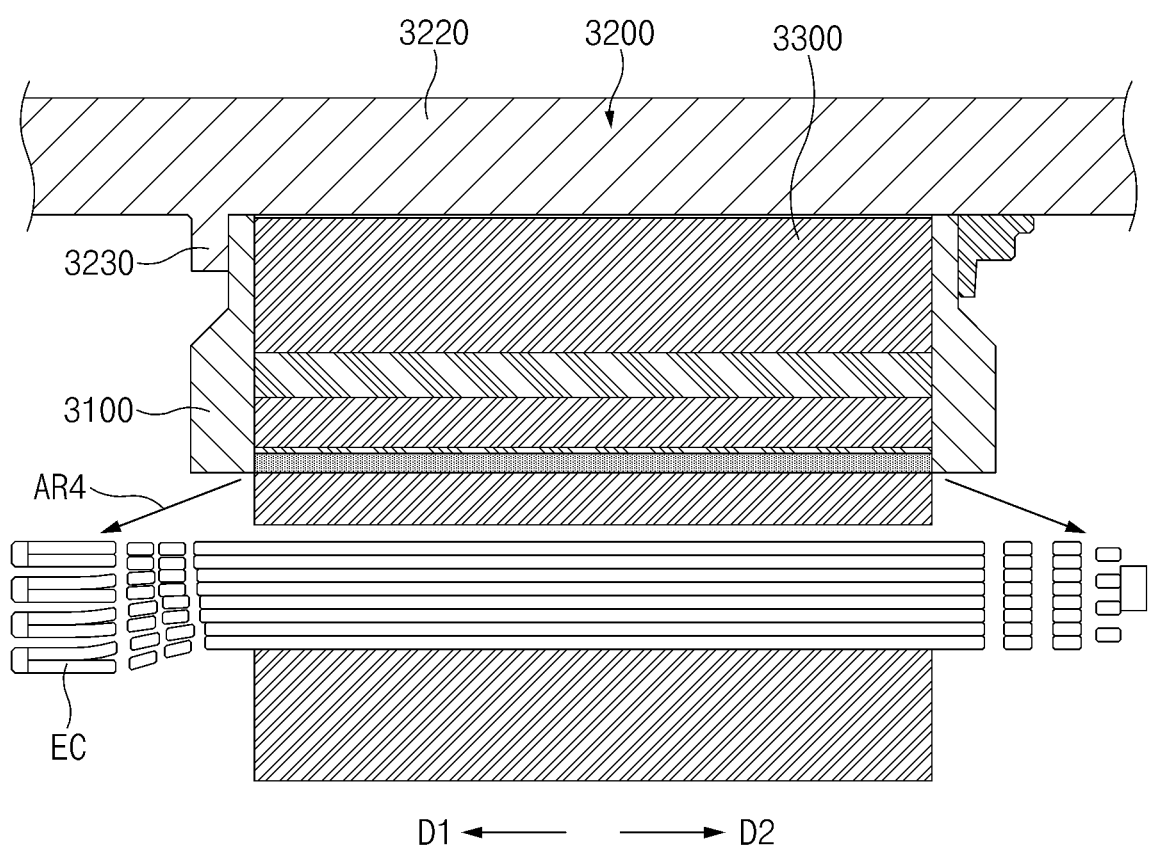
FIG. 26 is a cross-sectional view illustrating the rotor assembly including the rotor plate according to the fourth embodiment of the present disclosure.

The first arrow AR1 denoted by AR1 in FIG. 22 refers to a direction of an example, in which the oil collides with the rotor plate 3100. Forces in the direction of the second arrow AR2 and the direction of the third arrow AR3 illustrated in FIG. 22 are applied to the oil that collides with the rotor plate 3100 due to the shape of the second surface 3122. As a result, the oil that collides with the rotor plate 3100 spatters in the direction of the fourth arrow AR4 that is a direction obtained by adding the direction, which the second arrow AR2 faces, and the direction, which the third arrow AR3 faces. As illustrated in FIG. 26, the direction of the fourth arrow AR4 may be a direction that faces the end coil EC.

Rotor Assembly of Rotor Plate 3100 According to Fourth Embodiment

Figure 23:
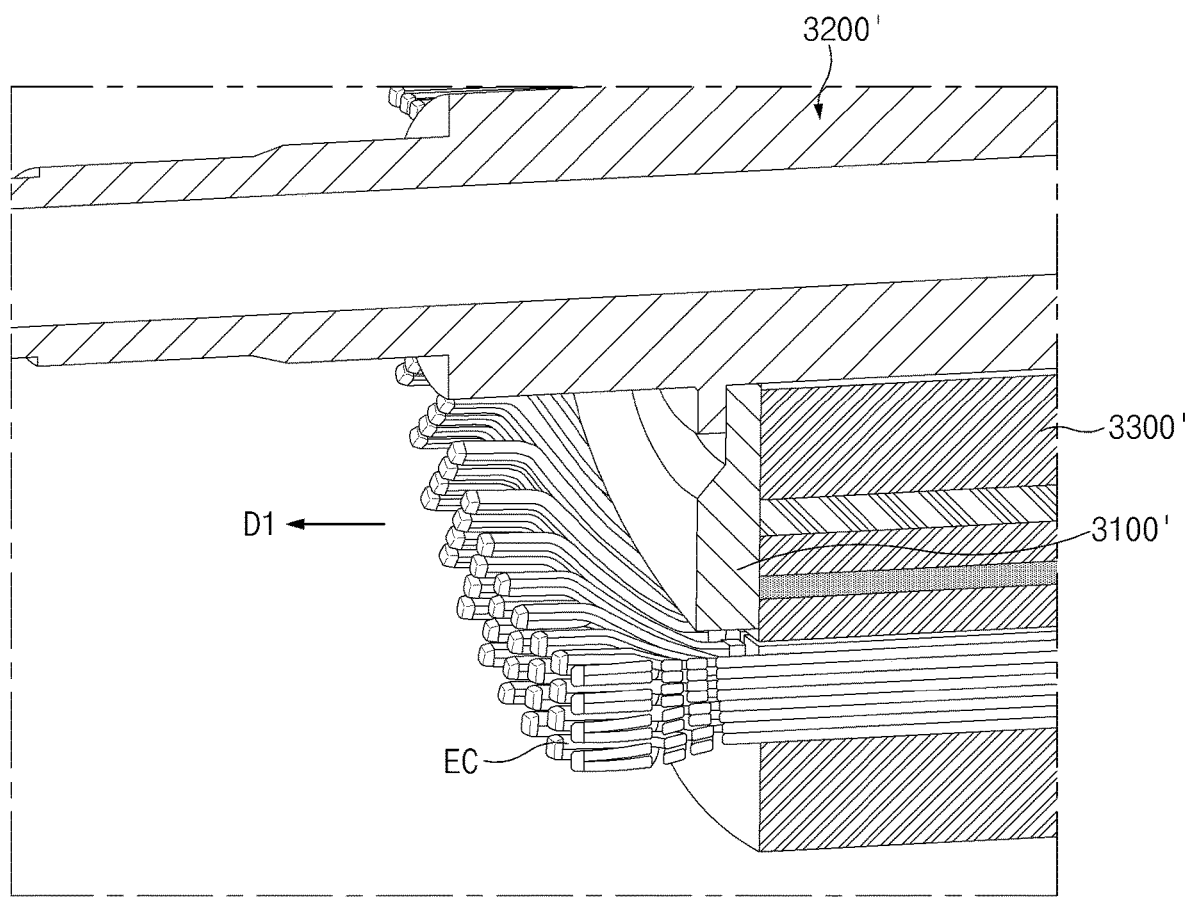
FIG. 23 is a partially enlarged perspective view of a conventional rotor assembly including a rotor plate.
Figure 24:
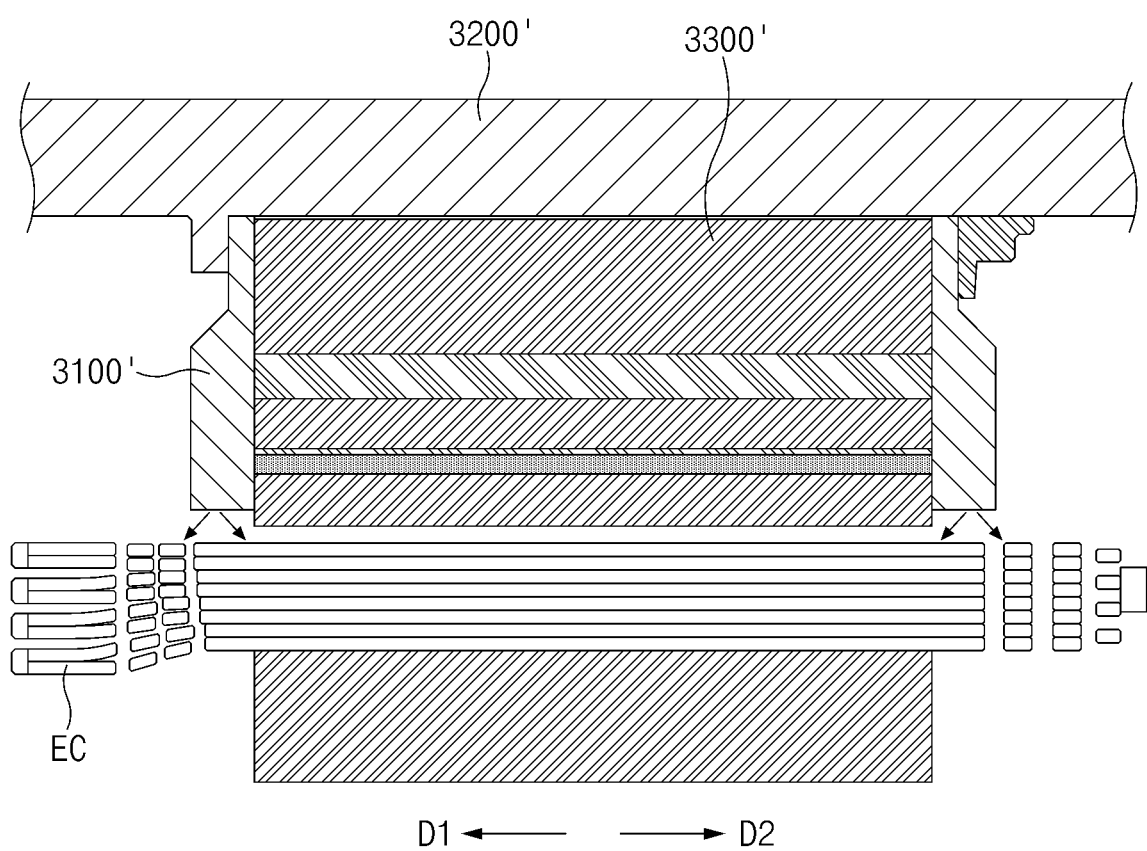
FIG. 24 is a cross-sectional view of the rotor assembly including the rotor plate.
Figure 25:
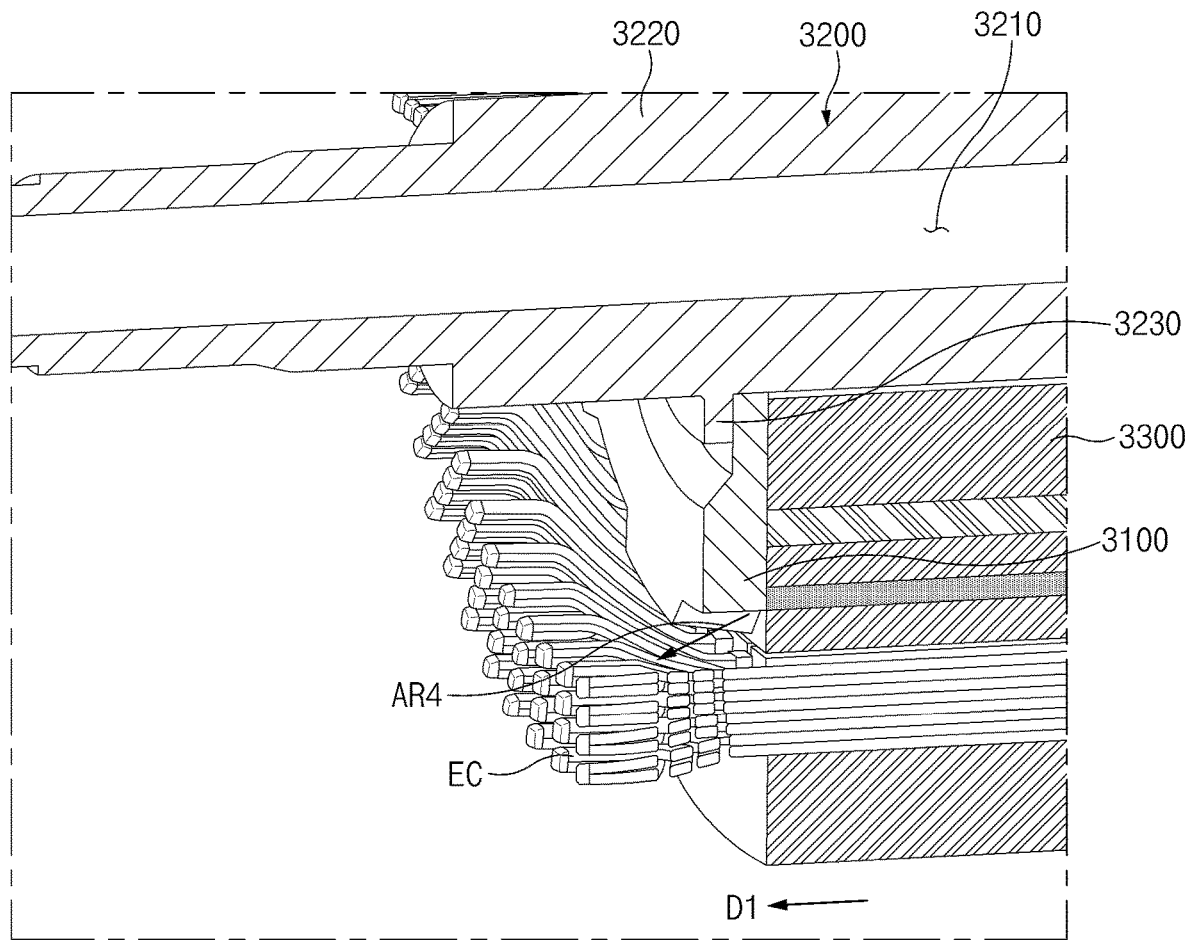
FIG. 25 is a partially enlarged perspective view illustrating the rotor assembly including the rotor plate according to the fourth embodiment of the present disclosure.
Figure 27:
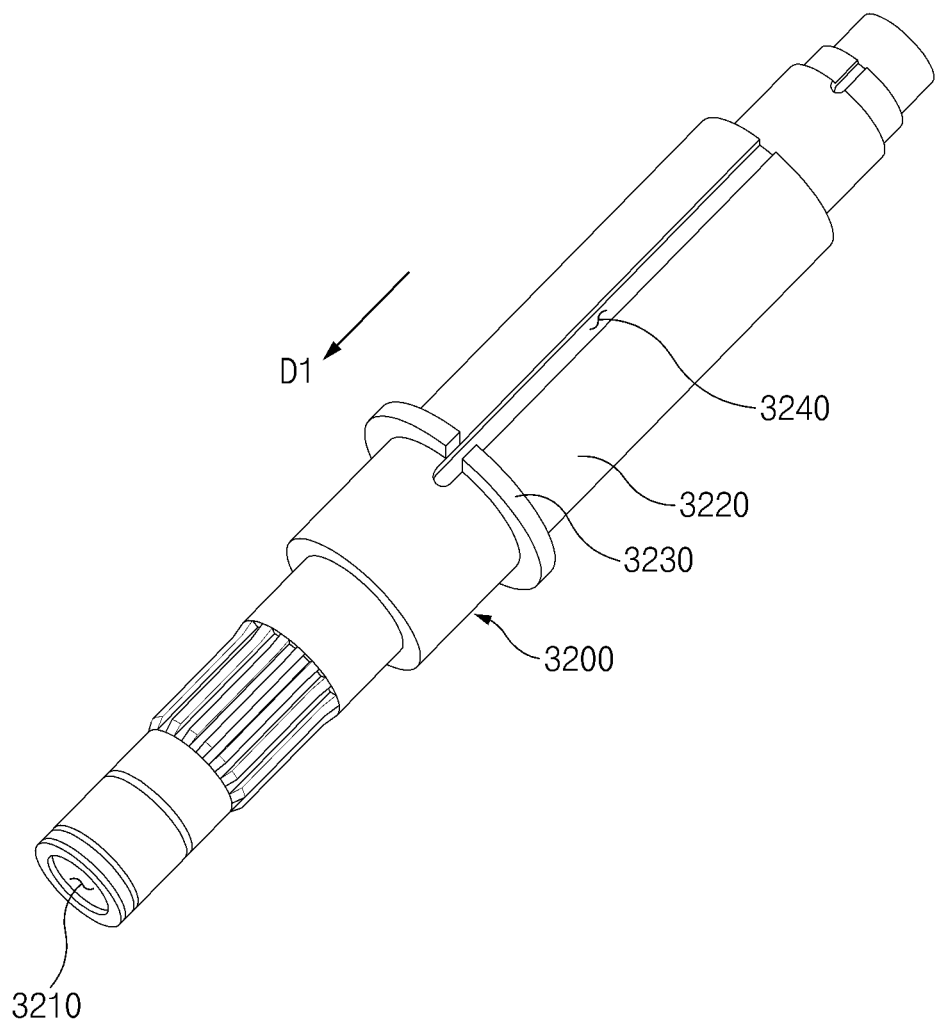
FIG. 27 is a perspective view illustrating a rotor shaft of the rotor assembly including the rotor plate according to the fourth embodiment of the present disclosure.
Figure 28:
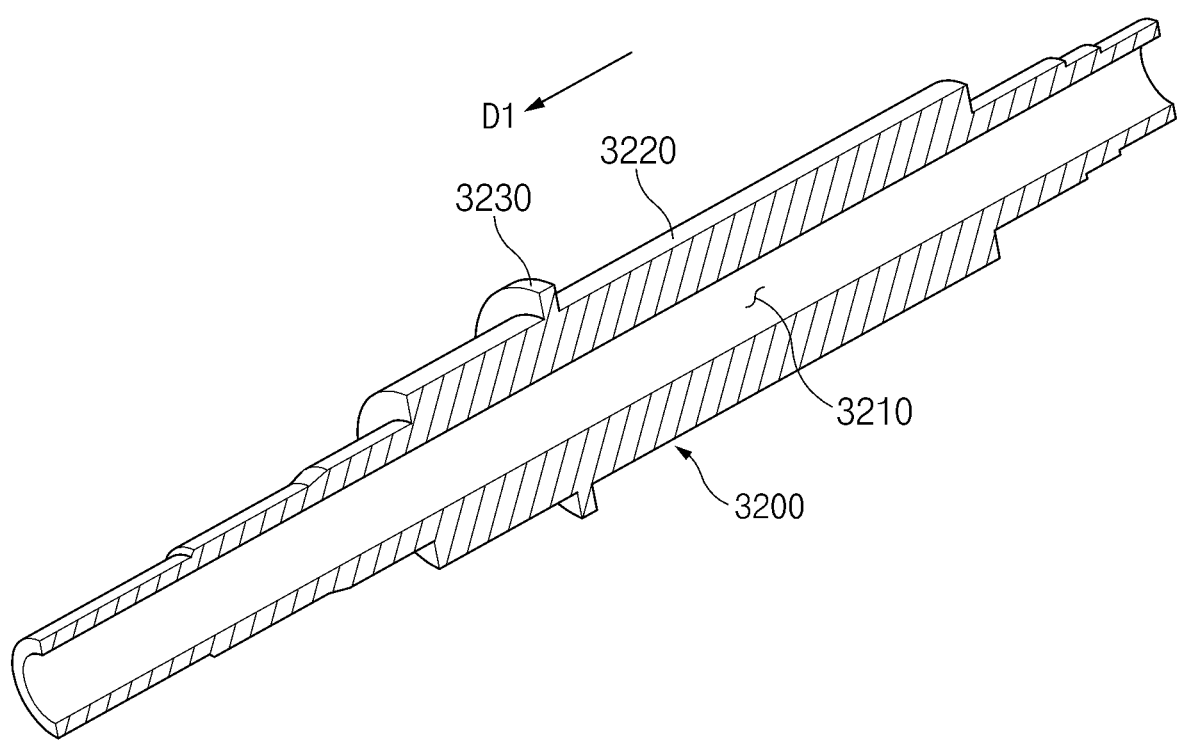
FIG. 28 is a cross-sectional view of FIG. 27.

FIG. 23 is a partially enlarged perspective view of a conventional rotor assembly including a rotor plate 3100'. FIG. 24 is a cross-sectional view of the rotor assembly including the rotor plate 3100. FIG. 25 is a partially enlarged perspective view illustrating the rotor assembly including the rotor plate 3100 according to the fourth embodiment of the present disclosure. FIG. 26 is a cross-sectional view illustrating the rotor assembly including the rotor plate 3100 according to the fourth embodiment of the present disclosure. FIG. 27 is a perspective view illustrating the rotor shaft 3200 of the rotor assembly including the rotor plate 3100 according to the fourth embodiment of the present disclosure. FIG. 28 is a cross-sectional view of FIG. 27.

Hereinafter, the rotor assembly including the rotor plate 3100 according to the fourth embodiment will be described in detail with reference to FIGS. 25 to 28.

As illustrated in FIGS. 25 and 26, the rotor assembly may include the rotor plate 3100, the rotor shaft 3200, and a rotor core 3300.

The rotor plate 3100 may be disposed to surround the outer peripheral surface of the rotor shaft 3200, and may be disposed in an end of the rotor core 3300 in an axial direction thereof. Here, the axial direction may be a concept corresponding to any one of the first direction D1 or the second direction D2. In detail, the axial direction may refer to, among the first direction D1 and the second direction D2, a direction that faces an outside of the rotor assembly. As an example, in FIG. 27, the axial direction may coincide with the first direction D1.

The rotor plate 3100 may include the plate body 3110 and the slot 3120 (see FIGS. 20 and 21). The above-mentioned contents may be referenced for a detailed description of the rotor plate 3100.

As illustrated in FIGS. 27 and 28, the rotor shaft 3200 may extend in the first direction D1. The rotor shaft 3200 may include a first passage 3210. The first passage 3210 may extend in the first direction D1.

As an example, the rotor shaft 3200 may include a shaft body 3220 and a protruding member 3230. The first passage 3210 may be formed in an interior of the shaft body 3220. The shaft groove 3240 may be formed in the shaft body 3220. The protruding member 3230 may protrude from one point of the shaft body 3220 in the radially outward direction of the shaft body 3220. The protruding member 3230 may be provided to contact a side surface of the rotor plate 3100 in the axial direction thereof.

The rotor core 3300 may be disposed to surround the outer peripheral surface of the rotor shaft 3200. The rotor core 3300 may include a magnet in the interior thereof.

<Flows of Oil>

Hereinafter, the flows of the oil of the rotor assembly including the rotor plate 3100 according to the fourth embodiment of the present disclosure will be described in detail based on the above-mentioned contents.

First, for comparison, flows of the oil of the rotor assembly including the conventional rotor plate 3100' will be described in detail with reference to FIGS. 23 and 24.

The conventional rotor assembly including the rotor plate 3100' is similar as a whole in shapes of a rotor shaft 3200' and a rotor core 3300', but is different in an aspect that no slot is formed in the rotor plate 3100'. As illustrated in FIG. 24, because the conventional rotor plate 3100' does not include a slot for changing a path of the coil, the oil is stricken away in an arbitrary direction during rotation thereof.

However, in the rotor assembly including the rotor plate 3100 according to the fourth embodiment of the present disclosure, when the oil that is ejected from the oil pipe or is filled in the interior of the motor is introduced into the rotor plate 3100, the oil collides the second surface 3122 or the third surface 3123 according to the rotational direction of the rotor plate 3100. In this process, as illustrated in FIGS. 22, 25, and 26, the oil is discharged in the direction of the fourth arrow AR4. Then, because the fourth arrow AR4 indicates a direction that faces the end coil EC, the end coil EC may be cooled in this process.

According to the rotor assembly including the rotor plate 3100 according to the fourth embodiment of the present disclosure, the flow velocity of the oil may be increased because a torque is efficiently delivered to the oil. Furthermore, an accurate orientation that faces the end coil EC may be given to the oil, and thus the cooling efficiency of the end coil may be enhanced.

According to the present disclosure, because oil may be delivered to the end coil well so that the oil may be sprayed uniformly, and because the torque due to the rotation of the rotor plate may be delivered to the oil well so that the flow velocity of the oil may be increased, whereby the cooling performance of the motor may be improved.

The present disclosure has been made to solve the above-mentioned problems occurring in the prior art while advantages achieved by the prior art are maintained intact.

An aspect of the present disclosure provides a rotor plate that may deliver oil to an end coil well and deliver a torque due to rotation of the rotor plate to the oil well, and a rotor assembly including the same.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A rotor plate comprising:
   a plate body comprising a first part having a first hole at a center thereof, and a second part having a second hole at a center thereof, the second part having a diameter corresponding to the first part, and connected to the first part in a first direction that is an axial direction perpendicular to the first part, and a diameter of the second hole is larger than a diameter of the first hole;

a first slot recessed on an outer peripheral surface of the plate body, and a length of the first slot along the first direction being smaller than a length of the plate body along the first direction;

a second slot recessed on the outer peripheral surface of the plate body, and a length of the second slot along the first direction corresponding to a length of the plate body along the first direction; and a first plate passage formed on a wall of the first part in a second direction that is opposite to the first direction, and connecting the first slot and the first hole.

2. The rotor plate of claim 1, wherein a width of the first slot along a circumferential direction of the plate body increases in the first direction.

3. The rotor plate of claim 1, wherein a width of the second slot along a circumferential direction of the plate body increases in the first direction.

4. The rotor plate of claim 1, wherein the first slot is opened in the first direction, and wherein the rotor plate further comprises a passage hole formed at a distal end of the first slot in the second direction, and connecting the first plate passage and the first slot.

5. The rotor plate of claim 4, wherein a side wall of the first part in the second direction comprises:

a peripheral area located in a radially outward direction of the first hole with respect to the passage hole.

6. The rotor plate of claim 1, wherein the first slot comprises:

a (1-1)-th surface facing a radially outward direction of the plate body;

a (1-2)-th surface provided on one side of the (1-1)-th surface and connecting the outer peripheral surface of the plate body and the (1-1)-th surface;

a (1-3)-th surface provided on an opposite side of the (1-1)-th surface and connecting the outer peripheral surface of the plate body and the (1-1)-th surface; and a (1-4)-th surface provided in the second direction of the (1-1)-th surface and connecting the (1-2)-th surface and the (1-3)-th surface.

7. The rotor plate of claim 6, wherein the (1-2)-th surface and the (1-3)-th surface are curved surfaces.

8. The rotor plate of claim 6, wherein a (1-1)-th line that is a border line of the (1-1)-th surface and the (1-2)-th surface and a (1-2)-th line that is a border line of the (1-1)-th surface and the (1-3)-th surface are inclined with respect to the first direction.

9. The rotor plate of claim 6, wherein a (1-1)-th line that is a border line of the (1-1)-th surface and the (1-2)-th surface and a (1-2)-th line that is a border line of the (1-1)-th surface and the (1-3)-th surface are curved lines.

10. The rotor plate of claim 6, wherein a (1-3)-th line that is a border line of the outer peripheral surface and the (1-2)-th surface and a (1-4)-th line that is a border line of the outer peripheral surface and the (1-3)-th surface are inclined with respect to the first direction.

11. The rotor plate of claim 6, wherein a (1-3)-th line that is a border line of the outer peripheral surface and the (1-2)-th surface and a (1-4)-th line that is a border line of the outer peripheral surface and the (1-3)-th surface are curved lines.

12. The rotor plate of claim 1, wherein the second slot comprises:

a (2-1)-th surface facing a radially outward direction of the plate body;

a (2-2)-th surface provided on one side of the (2-1)-th surface and connecting the outer peripheral surface of the plate body and the (2-1)-th surface; and a (2-3)-th surface provided on an opposite side of the (2-1)-th surface and connecting the outer peripheral surface of the plate body and the (2-1)-th surface.

13. The rotor plate of claim 12, wherein the (2-2)-th surface and the (2-3)-th surface are curved surfaces.

14. The rotor plate of claim 1, wherein the first slot and the second slot are alternately arranged along a circumferential direction of the plate body.

15. The rotor plate of claim 1, wherein the plate body further comprises:

a boss member protruding from a first area of the first part in a radially inward direction of the first hole, the first area being an area that defines the first hole.

16. The rotor plate of claim 1, wherein a diameter of the second hole increases in the first direction.

17. A rotor assembly comprising:

a rotor shaft extending in a first direction, and having a first passage extending in the first direction and a second passage communicated with an interior of the first passage, the second passage extending in a radially outward direction of the first passage;

a rotor core disposed to surround an outer peripheral surface of the rotor shaft; and a rotor plate comprising a first plate passage disposed to surround the outer peripheral surface of the rotor shaft, extending in the radially outward direction, and communicated with the second passage, and a second plate passage bent at a distal end of the first plate passage in the radially outward direction.

18. The rotor assembly of claim 17, wherein the rotor plate comprises:

a plate body;

a first slot recessed on the outer peripheral surface of the plate body having a length along the first direction smaller than a length of the plate body along the first direction, and the first slot formed to be opened in the first direction, wherein the rotor plate further comprises a passage hole formed at a distal end of the first slot in a second direction, and connecting the first plate passage and the first slot, and wherein the second plate passage is defined by the first slot.

19. The rotor assembly of claim 17, wherein the rotor core comprises:

a core passage communicating with the first plate passage and extending along the first direction.

* * * * *